United States Patent
Hua et al.

(10) Patent No.: US 11,974,304 B2
(45) Date of Patent: Apr. 30, 2024

(54) WIRELESS COMMUNICATION METHOD AND WIRELESS COMMUNICATIONS APPARATUS

(71) Applicant: HUAWEI TECHNOLOGIES CO., LTD., Guangdong (CN)

(72) Inventors: Meng Hua, Shanghai (CN); Fei Gao, Shanghai (CN); Shurong Jiao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 551 days.

(21) Appl. No.: 17/129,470

(22) Filed: Dec. 21, 2020

(65) Prior Publication Data

US 2021/0112563 A1    Apr. 15, 2021

Related U.S. Application Data

(63) Continuation of application No. PCT/CN2019/092490, filed on Jun. 24, 2019.

(30) Foreign Application Priority Data

Jun. 22, 2018  (CN) ......................... 201810654744.3

(51) Int. Cl.
*H04L 27/26*    (2006.01)
*H04L 1/1607*    (2023.01)
(Continued)

(52) U.S. Cl.
CPC .......... *H04W 72/53* (2023.01); *H04L 1/1642* (2013.01); *H04L 27/26025* (2021.01);
(Continued)

(58) Field of Classification Search
CPC ............. H04W 72/53; H04W 72/0446; H04W 72/0453; H04W 72/23; H04W 72/1268;
(Continued)

(56) References Cited

U.S. PATENT DOCUMENTS

| | | |
|---|---|---|
| 8,537,787 B2 | 9/2013 | Qu et al. |
| 2011/0243261 A1 | 10/2011 | Bienas et al. |

(Continued)

FOREIGN PATENT DOCUMENTS

| | | |
|---|---|---|
| CN | 103024919 A | 4/2013 |
| CN | 104412689 A | 3/2015 |

(Continued)

OTHER PUBLICATIONS

Office Action issued in Indian Application No. 202047056730 dated Jan. 3, 2022, 6 pages.

(Continued)

*Primary Examiner* — Ashley Shivers
(74) *Attorney, Agent, or Firm* — Fish & Richardson P.C.

(57) ABSTRACT

This application provides a method, which includes: receiving, by a terminal side device, physical layer signaling sent by a network side device in a first frequency band; and determining, by the terminal side device, a sequence number of a first time transmission unit in a second frequency band, where the first time transmission unit includes a time resource indicated by the physical layer signaling, the sequence number of the first time transmission unit is greater than or equal to a sequence number of a second time transmission unit in the second frequency band, an end time of the physical layer signaling is within a time range of the second time transmission unit, and a subcarrier spacing of the first frequency band is different from a subcarrier spacing of the second frequency band.

20 Claims, 10 Drawing Sheets

(51) Int. Cl.
    *H04W 72/0446* (2023.01)
    *H04W 72/0453* (2023.01)
    *H04W 72/23* (2023.01)
    *H04W 72/53* (2023.01)
(52) U.S. Cl.
    CPC ... *H04W 72/0446* (2013.01); *H04W 72/0453* (2013.01); *H04W 72/23* (2023.01)
(58) Field of Classification Search
    CPC ............ H04W 72/1273; H04L 1/1642; H04L 27/26025; H04L 5/0044; H04L 5/0094
    See application file for complete search history.

(56) References Cited

U.S. PATENT DOCUMENTS

| | | | |
|---|---|---|---|
| 2011/0274074 A1 | 11/2011 | Min et al. | |
| 2013/0215853 A1* | 8/2013 | Li | H04L 5/0053 370/329 |
| 2015/0304994 A1* | 10/2015 | Kim | H04L 27/2601 370/280 |
| 2017/0026997 A1* | 1/2017 | Moulsley | H04L 1/18 |
| 2017/0331577 A1 | 11/2017 | Parkvall et al. | |
| 2018/0041314 A1* | 2/2018 | Lin | H04W 72/1263 |
| 2018/0220444 A1* | 8/2018 | Lee | H04L 27/2646 |
| 2019/0075614 A1* | 3/2019 | Li | H04L 51/58 |
| 2019/0342915 A1* | 11/2019 | Kim | H04W 72/20 |

FOREIGN PATENT DOCUMENTS

| | | |
|---|---|---|
| CN | 106714322 A | 5/2017 |
| CN | 107950065 A | 4/2018 |

OTHER PUBLICATIONS

3GPP TS 36.214 V15.1.0 (Mar. 2018), "3rd Generation Partnership Project;Technical Specification Group Radio Access Network;Evolved Universal Terrestrial Radio Access (E-UTRA);Physical layer;Measurements(Release 15)," Mar. 2018, 24 pages.

3GPP TS 36.306 V15.0.0 (Mar. 2018), "3rd Generation Partnership Project;Technical Specification Group Radio Access Network;Evolved Universal Terrestrial Radio Access (E-UTRA);User Equipment (UE) radio access capabilities (Release 15)," Mar. 2018, 86 pages.

3GPP TS 38.211 V15.1.0 (Mar. 2018), "3rd Generation Partnership Project;Technical Specification Group Radio Access Network;NR;Physical channels and modulation(Release 15)," Mar. 2018, 90 pages.

3GPP TS 38.212 V15.1.1 (Apr. 2018), "3rd Generation Partnership Project;Technical Specification Group Radio Access Network;NR;Multiplexing and channel coding(Release 15)," Apr. 2018, 94 pages.

3GPP TS 38.214 V15.1.0 (Mar. 2018), "3rd Generation Partnership Project;Technical Specification Group Radio Access Network;NR;Physical layer procedures for data (Release 15)," Mar. 2018, 77 pages.

3GPP TS 38.306 V15.2.0 (Jun. 2018), "3rd Generation Partnership Project;Technical Specification Group Radio Access Network;NR;User Equipment (UE) radio access capabilities(Release 15)," Jun. 2018, 28 pages.

3GPP TS 38.321 V15.2.0 (Jun. 2018), "3rd Generation Partnership Project;Technical Specification Group Radio Access Network;NR;Medium Access Control (MAC) protocol specification(Release 15)," Jun. 2018, 73 pages.

Bgpp TS 38.331 V15.2.1 (Jun. 2018), "3rd Generation Partnership Project;Technical Specification Group Radio Access Network;NR-;Radio Resource Control (RRC) protocol specification(Release 15)," Jun. 2018, 303 pages.

MediaTek Inc., "Remaining issues in carrier aggregation," 3GPP TSG RAN WG1 Meeting #92, R1-1801649, Athens, Greece, Feb. 26-Mar. 2, 2018, 8 pages.

MediaTek Inc., "Remaining issues of DLUL scheduling and HARQ management," 3GPP TSG RAN WG1 Meeting #93, R1-1806801, Busan, Korea, May 21-25, 2018, 9 pages.

Office Action issued in Chinese Application No. 201810654744.3 dated May 6, 2021, 18 pages (with English translation).

PCT International Search Report issued in International Application No. PCT/CN2019/092490 dated Sep. 27, 2019, 13 pages (with English translation).

* cited by examiner

WIRELESS COMMUNICATION METHOD AND WIRELESS COMMUNICATIONS APPARATUS

CROSS-REFERENCE TO RELATED APPLICATIONS

This application is a continuation of International Application No. PCT/CN2019/092490, filed on Jun. 24, 2019, which claims priority to earlier Chinese Patent Application No. 201810654744.3, filed on Jun. 22, 2018. The disclosures of the aforementioned applications are hereby incorporated by reference in their entireties.

TECHNICAL FIELD

This application relates to communications technologies, and in particular, to a wireless communication method and a wireless communications apparatus.

BACKGROUND

A cross-carrier scheduling manner in carrier aggregation is defined in a technical specification (TS), for example, the 38.214 protocol, of the 3rd generation partnership project (3GPP). A terminal side device can obtain downlink control information (DCI) from a physical downlink control channel (PDCCH) transmitted on a scheduling carrier sent by a base station, and transmit a physical downlink shared channel (PDSCH)/physical uplink shared channel (PUSCH) of the terminal side device on the carrier and/or another scheduled carrier based on scheduling information of the DCI, so that radio resource utilization efficiency is improved.

In the prior art, that a PDCCH may appear at any position in a time transmission unit (where a slot is used as an example) is specified in the RAN1 #93 agreements. The terminal side device may obtain, at any time of a slot, DCI carried on the PDCCH. In this way, in a scenario in which a subcarrier spacing of a scheduling carrier is different from a subcarrier spacing of a scheduled carrier, and the subcarrier spacing of the scheduling carrier is less than the subcarrier spacing of the scheduled carrier, a time range of one slot of the scheduling carrier corresponds to a plurality of slots of the scheduled carrier. During cross-carrier scheduling, if the terminal side device receives the DCI at a tail end of a slot whose sequence number is n of the scheduling carrier, the following two cases may exist.

1. If the DCI is used to schedule a PDSCH, all of the plurality of slots that are of the scheduled carrier and that correspond to the slot of the scheduling carrier may be used to transmit the PDSCH. Therefore, the terminal side device needs to store as many slots of the scheduled carrier as possible, to obtain, after obtaining the DCI, the PDSCH from a slot that is of the scheduled carrier and that is before an end time of the DCI. This imposes a relatively high requirement on a storage function of the terminal side device, resulting in reduction of communication efficiency of the terminal side device.

2. If the DCI is used to schedule a PUSCH, all of the plurality of slots that are of the scheduled carrier and that correspond to the slot of the scheduling carrier can be used to transmit the PUSCH. However, no preparation processing time is reserved for the terminal side device to obtain the DCI through parsing and prepare data to be sent on the PUSCH. In this case, the terminal side device cannot send the data on the PUSCH in a slot that is of the scheduled carrier and that is before the end of preparation processing. Consequently, a waste of radio resources is caused, and communication efficiency of the terminal side device is further reduced.

Therefore, how to improve communication efficiency of a terminal side device during cross-carrier scheduling is a technical problem that needs to be urgently resolved currently.

SUMMARY

This application provides a wireless communication method and a wireless communications apparatus. A terminal side device determines, by considering a relationship between an end time of physical layer signaling on a first carrier and a time transmission unit on a second carrier, a sequence number of a time transmission unit in which a time resource is located, where the time resource is used to transmit communication data indicated by the physical layer signaling and is on the second carrier, to improve communication efficiency of the terminal side device during cross-carrier communication.

A first aspect of this application provides a wireless communication method, including:

receiving, by a terminal side device, physical layer signaling sent by a network side device in a first frequency band, where the physical layer signaling is used to indicate a time resource used for communication data in a second frequency band;

determining, by the terminal side device, a sequence number of a first time transmission unit in the second frequency band, where the first time transmission unit includes the time resource indicated by the physical layer signaling, the sequence number of the first time transmission unit is greater than or equal to a sequence number of a second time transmission unit in the second frequency band, an end time of the physical layer signaling is within a time range of the second time transmission unit, and a subcarrier spacing of the first frequency band is different from a subcarrier spacing of the second frequency band; and receiving or sending, by the terminal side device, the communication data on the time resource included in the first time transmission unit.

According to the wireless communication method provided in this embodiment, the sequence number that is of the first time transmission unit and that is determined by the terminal side device can be less than the sequence number of the second time transmission unit that is in the second frequency band and that corresponds to the end moment of the physical layer signaling in the first frequency band, where the time resource used for the communication data in the second frequency band is located in the first time transmission unit, so that communication efficiency of the terminal side device is improved.

In an embodiment of the first aspect of this application, when the communication data is uplink communication data, a difference between the sequence number of the first time transmission unit and the sequence number of the second time transmission unit is greater than or equal to a preset positive integer threshold.

In this embodiment, for the uplink communication data sent by the terminal side device to the network side device, the difference between the sequence number that is of the first time transmission unit and that is determined by the terminal side device and the sequence number of the second time transmission unit is further greater than or equal to the preset integer threshold based on the foregoing embodiment, and a time range of time transmission corresponding to the preset integer threshold is used by the terminal side device to obtain the physical layer signaling through parsing. In this way, even if the terminal side device obtains the physical layer signaling from the second half of a time transmission unit in the first frequency band, a reserved time further exists for performing operations such as parsing and checking on the physical layer signaling, then determining the time resource that is for the uplink communication data and that is indicated by the physical layer signaling, and preparing for sending the uplink data on the time resource indicated by the physical layer signaling. This avoids a case in which a configured time resource cannot be used and a parameter configured in a resource indication table used to configure a time resource cannot be used, thereby further improving the communication efficiency of the terminal side device.

In an embodiment of the first aspect of this application, the determining, by the terminal side device, a sequence number of a first time transmission unit in the second frequency band includes:

determining, by the terminal side device, the sequence number of the first time transmission unit based on a sum of the sequence number of the second time transmission unit and a first parameter, where the first parameter is used by the terminal side device to determine the time resource.

According to the method for calculating the sequence number of the first time transmission unit provided in this embodiment, the sequence number of the first time transmission unit can be determined by adding the first parameter to the sequence number of the second time transmission unit that is in the second frequency band and that corresponds to the end time of the physical layer signaling. Therefore, the sequence number and a relative position of the first time transmission unit can be conveniently determined based on the sequence number and a relative position of the second time transmission unit, thereby ensuring that the sequence number that is of the first time transmission unit and that can be determined by the terminal side device is greater than or equal to the sequence number of the second time transmission unit in the second frequency band; in other words, the sequence number of the first time transmission unit is not less than the sequence number of the second time transmission unit.

In an embodiment of the first aspect of this application, before the determining, by the terminal side device, the sequence number of the first time transmission unit based on a sum of the sequence number of the second time transmission unit and a first parameter, the method further includes:

determining, by the terminal side device, a third time transmission unit in the second frequency band, where the third time transmission unit is aligned with a fourth time transmission unit in the first frequency band, and the physical layer signaling uses a time resource of the fourth time transmission unit in the first frequency band; and determining, by the terminal side device, the sequence number of the second time transmission unit based on a sum of a sequence number of the third time transmission unit and a second parameter, where the second parameter is used to indicate a relationship between the sequence number of the second time transmission unit and the sequence number of the third time transmission unit.

According to the method for calculating the sequence number of the second time transmission unit provided in this embodiment, the sequence number of the second time transmission unit can be obtained by adding the second parameter to the sequence number of the third time transmission unit aligned with the fourth time transmission unit. In this way, the terminal side device can determine the sequence number of the first time transmission unit based on the sequence number of the second time transmission unit. Determining the sequence number of the second time transmission unit based on the third time transmission unit and the fourth time transmission unit that are aligned with each other further provides a more direct and accurate calculation manner than directly searching for the corresponding second time transmission unit at the end time of the physical layer signaling.

In an embodiment of the first aspect of this application, before the determining, by the terminal side device, the sequence number of the second time transmission unit based on a sum of a sequence number of the third time transmission unit and a second parameter, the method further includes:

determining, by the terminal side device in a time range of the fourth time transmission unit, N corresponding time transmission units in the second frequency band, where N≥2; and determining, by the terminal side device, the second parameter based on a relative relationship between the end time of the physical layer signaling and the N time transmission units.

The method for calculating the second parameter provided in this embodiment is a relatively direct and effective manner. Because the second parameter is used to indicate the relationship between the sequence number of the second time transmission unit and the sequence number of the third time transmission unit, the second parameter is directly determined based on the relative position relationship between the end time of the physical layer signaling and the N corresponding time transmission units in the second frequency band.

In an embodiment of the first aspect of this application, before the determining, by the terminal side device, the sequence number of the second time transmission unit based on a sum of a sequence number of the third time transmission unit and a second parameter, the method further includes:

if the subcarrier spacing of the first frequency band is greater than or equal to the subcarrier spacing of the second frequency band, determining, by the terminal side device, that the second parameter is 0.

In the wireless communication method provided in this embodiment, when the subcarrier spacing of the first frequency band is greater than or equal to the subcarrier spacing of the second frequency band, the second parameter can be set to 0. In other words, the terminal side device adds the second parameter whose value is 0 to the original manner of determining the sequence number of the first time transmission unit. Adding of the determining step in this embodiment further enlarges an application scope of the wireless communication method in this application, and a most appropriate sequence number of the first time transmission unit can be determined in different value relationships between the subcarrier spacing of the first frequency band and the subcarrier spacing of the second frequency band, this further improves the communication efficiency of the terminal side device.

In an embodiment of the first aspect of this application, the determining, by the terminal side device, a sequence number of a first time transmission unit in the second frequency band includes:

calculating the sequence number of the first time transmission unit by using $$\left\lfloor n \cdot \frac{2^{\mu 2}}{2^{\mu 1}} \right\rfloor + t + K,$$

where n is a sequence number of the fourth time transmission unit, K is the first parameter, t is the second parameter, $\mu_1$ is a subcarrier spacing parameter of the first frequency band, $\mu_2$ is a subcarrier spacing parameter of the second frequency band, and $\Delta f=2^{\mu}\cdot 15$ [kHz] for a subcarrier spacing parameter $\mu$, where $\Delta f$ is a subcarrier spacing.

In an embodiment of the first aspect of this application, the first frequency band and the second frequency band are carriers; or the first frequency band and the second frequency band are bandwidth parts BWPs.

In an embodiment of the first aspect of this application, before the determining, by the terminal side device, the sequence number of the first time transmission unit based on a sum of the sequence number of the second time transmission unit and a first parameter, the method further includes:

determining, by the terminal side device, first configuration information based on a position of the physical layer signaling in the fourth time transmission unit in the first frequency band, where the fourth time transmission unit includes the physical layer signaling, the physical layer signaling has at least two relative positions in the fourth time unit, and each relative position corresponds to one type of configuration information; and determining, by the terminal side device, the first parameter based on the physical layer signaling and the first configuration information.

In an embodiment of the first aspect of this application, before the receiving, by a terminal side device, physical layer signaling sent by a network side device, the method further includes:

receiving, by the terminal side device, higher layer signaling from the network side device, where the higher layer signaling carries the at least two relative positions of the terminal side device and the configuration information corresponding to each relative position.

In this embodiment, different configuration information is determined based on different relative positions of the physical layer signaling, so that the terminal side device can obtain different values of the first parameter based on the different configuration information when same indication information, such as a same index, is carried in the physical layer signaling. Finally, the terminal side device obtains the different values of the first parameter based on the different relative positions of the physical layer signaling, and all the values of the first parameter can ensure that the sequence number that is of the first time transmission unit and that is finally determined by the terminal side device is not less than the sequence number of the second time transmission unit. Compared with the foregoing embodiment in which the second parameter is added to the calculation manner of determining the first time transmission unit, the original sequence number calculation manner is not changed, and the sequence number of the first time transmission unit may be determined through searching. This reduces a calculation amount of the terminal side device and further improves the communication efficiency of the terminal side device while achieving a same technical effect.

In an embodiment of the first aspect of this application, the communication data is downlink communication data; and after the receiving, by a terminal side device, physical layer signaling sent by a network side device, the method further includes:

determining, by the terminal side device, a fifth time transmission unit in the second frequency band, where the fifth time transmission unit includes the time resource indicated by the physical layer signaling, a sequence number of the fifth time transmission unit is less than the sequence number of the second time transmission unit, and a difference between the sequence number of the second time transmission unit and the sequence number of the fifth time transmission unit is less than N, where N is a quantity of time transmission units that are in the second frequency band and that can be stored in the terminal side device, and N≥2; and obtaining, by the terminal side device, the stored fifth time transmission unit, and obtaining the downlink communication data on the time resource included in the fifth time transmission unit.

In this embodiment, for the downlink communication data sent by the network side device to the terminal side device, the terminal side device can determine the sequence number of the fifth time transmission unit in the second frequency band, where the time resource for the downlink communication data indicated by the physical layer signaling is located in the fifth time transmission unit. The sequence number of the fifth time transmission unit may be less than the sequence number of the second time transmission unit, and the difference between the sequence number of the fifth time transmission unit and the sequence number of the second time transmission unit needs to be less than the quantity of time transmission units that are in the second frequency band and that can be stored in the terminal side device. In this way, after determining the sequence number of the fifth time transmission unit, the terminal side device can obtain the stored fifth time transmission unit from a storage device of the terminal side device, and obtain, through the fifth time transmission unit, the downlink communication data on the time resource indicated by the physical layer signaling. If the terminal side device can store more time transmission units corresponding to the downlink communication data, the terminal side device may allow the downlink communication data to appear in a time transmission unit prior to the second time transmission unit, and a storage capability of the terminal side device needs to be satisfied.

In an embodiment of the first aspect of this application, the method further includes: sending, by the terminal side device, N to the network side device.

In this embodiment provided in this application, the terminal side device can report the storage capability, namely, a capability of storing a time transmission unit in each frequency band, of the terminal side device. Therefore, both the terminal side device and the network side device can perform cross-carrier scheduling on the downlink communication data of the terminal side device based on the storage capability of the terminal side device, thereby avoiding a case in which a configuration of the cross-carrier scheduling exceeds the storage capability of the terminal side device.

In an embodiment of the first aspect of this application, the method further includes: determining, by the terminal side device, N based on a bandwidth of a bandwidth part BWP of the second frequency band and a bandwidth of the second frequency band.

In an embodiment of the first aspect of this application, the determining, by the terminal side device, N based on a bandwidth of a bandwidth part BWP of the second frequency band and a bandwidth of the second frequency band includes:

determining, by the terminal side device, N according to N=floor(bandwidth of the second frequency band/bandwidth of the BWP); or determining, by the terminal side device, N according to N=min(subcarrier spacing of the second frequency band/subcarrier spacing of the first frequency band, floor(bandwidth of the second frequency band/bandwidth of the BWP)).

More specifically, in Release 15 of the NR protocol, one downlink BWP is activated on each carrier of the terminal side device, and a bandwidth of the downlink BWP is less than or equal to a bandwidth of a downlink carrier. In this case, the terminal side device can determine the storage capability based on the bandwidth of the second frequency band and the bandwidth of the BWP, and further can enable the terminal side device to adjust the second parameter in the foregoing embodiment based on the storage capability of the terminal side device, to make the sequence number of the first time transmission unit be less than the sequence number of the second time transmission unit to some extent within the storage capability of the first time transmission unit, so that the terminal side device can support more possible slot scheduling during wireless communication.

In conclusion, in the wireless communication method provided in the first aspect of this application, the terminal side device receives the physical layer signaling sent by the network side device in the first frequency band, where the physical layer signaling is used to indicate the time resource used for the communication data in the second frequency band; the terminal side device determines the sequence number of the first time transmission unit in the second frequency band, where the first time transmission unit includes the time resource indicated by the physical layer signaling, the sequence number of the first time transmission unit is greater than or equal to the sequence number of the second time transmission unit in the second frequency band, the end time of the physical layer signaling is within the time range of the second time transmission unit, and the subcarrier spacing of the first frequency band is different from the subcarrier spacing of the second frequency band; and the terminal side device receives or sends the communication data on the time resource included in the first time transmission unit. According to the wireless communication method provided in this embodiment, the sequence number that is of the first time transmission unit and that is determined by the terminal side device can be less than the sequence number of the second time transmission unit that is in the second frequency band and that corresponds to the end moment of the physical layer signaling in the first frequency band, where the time resource used for the communication data in the second frequency band is located in the first time transmission unit, so that the communication efficiency of the terminal side device is improved.

A second aspect of this application provides a wireless communications apparatus. For beneficial effects of the apparatus provided in the following embodiments of the second aspect, refer to the beneficial effects brought by the corresponding embodiments of the first aspect. The apparatus includes a transceiver module and a processing module, where the transceiver module is configured to receive physical layer signaling sent by a network side device in a first frequency band, where the physical layer signaling is used to indicate a time resource used for communication data in a second frequency band;

the processing module is configured to determine a sequence number of a first time transmission unit in the second frequency band, where the first time transmission unit includes the time resource indicated by the physical layer signaling, the sequence number of the first time transmission unit is greater than or equal to a sequence number of a second time transmission unit in the second frequency band, an end time of the physical layer signaling is within a time range of the second time transmission unit, and a subcarrier spacing of the first frequency band is different from a subcarrier spacing of the second frequency band; and the processing module is configured to receive or send the communication data on the time resource included in the first time transmission unit.

In an embodiment of the second aspect of this application, when the communication data is uplink communication data, a difference between the sequence number of the first time transmission unit and the sequence number of the second time transmission unit is greater than or equal to a preset positive integer threshold.

In an embodiment of the second aspect of this application, the processing module is specifically configured to determine the sequence number of the first time transmission unit based on a sum of the sequence number of the second time transmission unit and a first parameter, where the first parameter is used by the terminal side device to determine the time resource.

In an embodiment of the second aspect of this application, the processing module is specifically configured to: determine a third time transmission unit in the second frequency band, where the third time transmission unit is aligned with a fourth time transmission unit in the first frequency band, and the physical layer signaling uses a time resource of the fourth time transmission unit in the first frequency band; and determine the sequence number of the second time transmission unit based on a sum of a sequence number of the third time transmission unit and a second parameter, where the second parameter is used to indicate a relationship between the sequence number of the second time transmission unit and the sequence number of the third time transmission unit.

In an embodiment of the second aspect of this application, the processing module is specifically configured to: determine, in the second frequency band in a time range of the fourth time transmission unit, N corresponding time transmission units, where N≥2; and determine the second parameter based on a relative relationship between the end time of the physical layer signaling and the N time transmission units.

In an embodiment of the second aspect of this application, the processing module is specifically configured to: if the subcarrier spacing of the first frequency band is greater than or equal to the subcarrier spacing of the second frequency band, determine that the second parameter is 0.

In an embodiment of the second aspect of this application, the processing module calculates the sequence number of the first time transmission unit by using $$\left\lfloor n \cdot \frac{2^{\mu 2}}{2^{\mu 1}} \right\rfloor + t + K,$$

where n is a sequence number of the fourth time transmission unit, K is the first parameter, t is the second parameter, $\mu_1$ is a subcarrier spacing parameter of the first frequency band, $\mu_2$ is a subcarrier spacing parameter of the second frequency band, and $\Delta f = 2^\mu \cdot 15$ [kHz] for a subcarrier spacing parameter $\mu$, where $\Delta f$ is a subcarrier spacing.

In an embodiment of the second aspect of this application, the first frequency band and the second frequency band are carriers; or the first frequency band and the second frequency band are bandwidth parts BWPs.

In an embodiment of the second aspect of this application, the processing module is further configured to: determine first configuration information based on a position of the physical layer signaling in the fourth time transmission unit in the first frequency band, where the fourth time transmission unit includes the physical layer signaling, the physical layer signaling has at least two relative positions in the fourth time unit, and each relative position corresponds to one type of configuration information; and determine the first parameter based on the physical layer signaling and the first configuration information.

In an embodiment of the second aspect of this application, the transceiver module is further configured to receive higher layer signaling from the network side device, where the higher layer signaling carries the at least two relative positions of the terminal side device and the configuration information corresponding to each relative position.

In an embodiment of the second aspect of this application, the communication data is downlink communication data; and the processing unit is further configured to determine a fifth time transmission unit in the second frequency band, where the fifth time transmission unit includes the time resource indicated by the physical layer signaling, a sequence number of the fifth time transmission unit is less than the sequence number of the second time transmission unit, and a difference between the sequence number of the second time transmission unit and the sequence number of the fifth time transmission unit is less than N, where N is a quantity of time transmission units that are in the second frequency band and that can be stored in the terminal side device, and N≥2; and the processing unit is further configured to: obtain the stored fifth time transmission unit, and obtain the downlink communication data on the time resource included in the fifth time transmission unit.

In an embodiment of the second aspect of this application, the transceiver module is further configured to send N to the network side device.

In an embodiment of the second aspect of this application, the processing module is further configured to determine N based on a bandwidth of a bandwidth part BWP of the second frequency band and a bandwidth of the second frequency band.

In an embodiment of the second aspect of this application, the processing module is specifically configured to: determine N according to N=floor(bandwidth of the second frequency band/bandwidth of the BWP); or determine N according to N=min(subcarrier spacing of the second frequency band/subcarrier spacing of the first frequency band, floor(bandwidth of the second frequency band/bandwidth of the BWP)).

In conclusion, in the wireless communications apparatus provided in the second aspect of this application, the transceiver module receives the physical layer signaling sent by the network side device in the first frequency band, where the physical layer signaling is used to indicate the time resource used for the communication data in the second frequency band; the first determining module determines the sequence number of the first time transmission unit in the second frequency band, where the first time transmission unit includes the time resource indicated by the physical layer signaling, the sequence number of the first time transmission unit is greater than or equal to the sequence number of the second time transmission unit in the second frequency band, the end time of the physical layer signaling is within the time range of the second time transmission unit, and the subcarrier spacing of the first frequency band is different from the subcarrier spacing of the second frequency band; and the second determining module receives or sends the communication data on the time resource included in the first time transmission unit. According to the wireless communications apparatus provided in this embodiment, the sequence number of the first time transmission unit can be less than the sequence number of the second time transmission unit that is in the second frequency band and that corresponds to the end moment of the physical layer signaling in the first frequency band, where the time resource used for the communication data in the second frequency band is located in the first time transmission unit, so that communication efficiency of the wireless communications apparatus is improved.

A third aspect of this application provides a terminal side device. For beneficial effects of the terminal side device provided in the following embodiments of the third aspect, refer to the beneficial effects brought by the corresponding embodiments of the first aspect. The terminal side device includes a processor, a memory, and an interface. The memory is configured to store a computer program, the processor invokes the computer program, and when executing the computer program, the processor is configured to perform the following operations:

receiving, through the interface, physical layer signaling sent by a network side device in a first frequency band, where the physical layer signaling is used to indicate a time resource used for communication data in a second frequency band;

determining a sequence number of a first time transmission unit in the second frequency band, where the first time transmission unit includes the time resource indicated by the physical layer signaling, the sequence number of the first time transmission unit is greater than or equal to a sequence number of a second time transmission unit in the second frequency band, an end time of the physical layer signaling is within a time range of the second time transmission unit, and a subcarrier spacing of the first frequency band is different from a subcarrier spacing of the second frequency band; and receiving or sending the communication data on the time resource included in the first time transmission unit.

In an embodiment of the third aspect of this application, when the communication data is uplink communication data, a difference between the sequence number of the first time transmission unit and the sequence number of the second time transmission unit is greater than or equal to a preset positive integer threshold.

In an embodiment of the third aspect of this application, the sequence number of the first time transmission unit is determined based on a sum of the sequence number of the second time transmission unit and a first parameter, where the first parameter is used by the terminal side device to determine the time resource.

In an embodiment of the third aspect of this application, a third time transmission unit in the second frequency band is determined, where the third time transmission unit is aligned with a fourth time transmission unit in the first frequency band, and the physical layer signaling uses a time resource of the fourth time transmission unit in the first frequency band; and the sequence number of the second time transmission unit is determined based on a sum of a sequence number of the third time transmission unit and a second parameter, where the second parameter is used to indicate a relationship between the sequence number of the second time transmission unit and the sequence number of the third time transmission unit.

In an embodiment of the third aspect of this application, N corresponding time transmission units in the second frequency band are determined in a time range of the fourth time transmission unit, where N≥2.

In an embodiment of the third aspect of this application, the second parameter is determined based on a relative relationship between the end time of the physical layer signaling and the N time transmission units.

In an embodiment of the third aspect of this application, if the subcarrier spacing of the first frequency band is greater than or equal to the subcarrier spacing of the second frequency band, that the second parameter is 0 is determined.

In an embodiment of the third aspect of this application, the sequence number of the first time transmission unit is calculated by using $$\left\lfloor n \cdot \frac{2^{\mu 2}}{2^{\mu 1}} \right\rfloor + t + K,$$

where n is a sequence number of the fourth time transmission unit, K is the first parameter, t is the second parameter, $\mu_1$ is a subcarrier spacing parameter of the first frequency band, $\mu_2$ is a subcarrier spacing parameter of the second frequency band, and $\Delta f = 2^\mu \cdot 15$ [kHz] for a subcarrier spacing parameter $\mu$, where $\Delta f$ is a subcarrier spacing.

In an embodiment of the third aspect of this application, the first frequency band and the second frequency band are carriers; or the first frequency band and the second frequency band are bandwidth parts BWPs.

In an embodiment of the third aspect of this application, first configuration information is determined based on a position of the physical layer signaling in the fourth time transmission unit in the first frequency band, where the fourth time transmission unit includes the physical layer signaling, the physical layer signaling has at least two relative positions in the fourth time unit, and each relative position corresponds to one type of configuration information; and the first parameter is determined based on the physical layer signaling and the first configuration information.

In an embodiment of the third aspect of this application, higher layer signaling is received from the network side device through the interface, where the higher layer signaling carries the at least two relative positions of the terminal side device and the configuration information corresponding to each relative position.

In an embodiment of the third aspect of this application, the communication data is downlink communication data; and a fifth time transmission unit in the second frequency band is determined, where the fifth time transmission unit includes the time resource indicated by the physical layer signaling, a sequence number of the fifth time transmission unit is less than the sequence number of the second time transmission unit, and a difference between the sequence number of the second time transmission unit and the sequence number of the fifth time transmission unit is less than N, where N is a quantity of time transmission units that are in the second frequency band and that can be stored in the terminal side device, and N≥2; and the stored fifth time transmission unit is obtained, and the downlink communication data is obtained on the time resource included in the fifth time transmission unit.

In an embodiment of the third aspect of this application, N is sent to the network side device through the interface.

In an embodiment of the third aspect of this application, N is determined based on a bandwidth of a bandwidth part BWP of the second frequency band and a bandwidth of the second frequency band.

In an embodiment of the third aspect of this application, N is determined according to N=floor(bandwidth of the second frequency band/bandwidth of the BWP); or N is determined according to N=min(subcarrier spacing of the second frequency band/subcarrier spacing of the first frequency band, floor(bandwidth of the second frequency band/bandwidth of the BWP)).

In conclusion, the terminal side device provided in the third aspect of this application can receive the physical layer signaling sent by the network side device in the first frequency band, where the physical layer signaling is used to indicate the time resource used for the communication data in the second frequency band; determine the sequence number of the first time transmission unit in the second frequency band, where the first time transmission unit includes the time resource indicated by the physical layer signaling, the sequence number of the first time transmission unit is greater than or equal to the sequence number of the second time transmission unit in the second frequency band, the end time of the physical layer signaling is within the time range of the second time transmission unit, and the subcarrier spacing of the first frequency band is different from the subcarrier spacing of the second frequency band; and then receive or send the communication data on the time resource included in the first time transmission unit. According to the terminal side device provided in this embodiment, the sequence number that is of the first time transmission unit and that is determined by the terminal side device can be less than the sequence number of the second time transmission unit that is in the second frequency band and that corresponds to the end moment of the physical layer signaling in the first frequency band, where the time resource used for the communication data in the second frequency band is located in the first time transmission unit, so that communication efficiency of the terminal side device is improved.

According to a fourth aspect, this application provides a wireless communication method, including: sending, by a network side device, physical layer signaling to a terminal side device in a first frequency band, where the physical layer signaling is used to indicate a time resource used for communication data in a second frequency band; and receiving or sending, by the network side device, the communication data on the time resource included in a first time transmission unit, where the first time transmission unit includes the time resource indicated by the physical layer signaling, a sequence number of the first time transmission unit is greater than or equal to a sequence number of a second time transmission unit in the second frequency band, an end time of the physical layer signaling is within a time range of the second time transmission unit, and a subcarrier spacing of the first frequency band is different from a subcarrier spacing of the second frequency band.

According to the wireless communication method provided in this embodiment, the network side device sends the physical layer signaling to the terminal side device in the first frequency band, and receives or sends the communication data on the time resource included in the first time transmission unit. The first time transmission unit includes the time resource indicated by the physical layer signaling, the sequence number of the first time transmission unit is greater than or equal to the sequence number of the second time transmission unit in the second frequency band, the end time of the physical layer signaling is within the time range of the second time transmission unit, and the subcarrier spacing of the first frequency band is different from the subcarrier spacing of the second frequency band. In this way, the sequence number that is of the first time transmission unit and that is determined by the terminal side device can be less than the sequence number of the second time transmission unit that is in the second frequency band and that corresponds to the end moment of the physical layer signaling in the first frequency band, where the time resource used for the communication data in the second frequency band is located in the first time transmission unit, so that communication efficiency of the terminal side device is improved.

In an embodiment of the fourth aspect of this application, when the communication data is uplink communication data, a difference between the sequence number of the first time transmission unit and the sequence number of the second time transmission unit is greater than or equal to a preset positive integer threshold.

In this embodiment, for the uplink communication data sent by the terminal side device to the network side device, the difference that is between the sequence number of the first time transmission unit and the sequence number of the second time transmission unit and that is determined by the network side device is further greater than or equal to the preset integer threshold based on the foregoing embodiment, and a time range of time transmission corresponding to the preset integer threshold is used by the terminal side device to obtain the physical layer signaling through parsing. In this way, even if the terminal side device obtains the physical layer signaling from the second half of a time transmission unit in the first frequency band, a reserved time further exists for performing operations such as parsing and checking on the physical layer signaling, then determining the time resource that is for the uplink communication data and that is indicated by the physical layer signaling, and preparing for sending the uplink data on the time resource indicated by the physical layer signaling. This avoids a case in which a configured time resource cannot be used and a parameter configured in a resource indication table used to configure a time resource cannot be used, thereby further improving the communication efficiency of the terminal side device.

In an embodiment of the fourth aspect of this application, the first frequency band and the second frequency band are carriers; or the first frequency band and the second frequency band are bandwidth parts BWPs.

In an embodiment of the fourth aspect of this application, the network side device sends higher layer signaling to the terminal side device, where the higher layer signaling carries at least two relative positions of the physical layer signaling of the terminal side device in a fourth time transmission unit in the first frequency band and configuration information corresponding to each relative position, the at least two pieces of configuration information are used by the terminal side device to determine first configuration information; and determines a first parameter based on the physical layer signaling and the first configuration information.

In this embodiment, the network side device sends, to the terminal side device, the higher layer signaling that is used to carry a plurality of relative positions and corresponding configuration information, so that the terminal side device determines different configuration information based on different relative positions of the physical layer signaling, and the terminal side device can obtain different values of the first parameter based on the different configuration information when indexes are the same. Finally, the terminal side device obtains the different values of the first parameter based on the different relative positions of the physical layer signaling, and all the values of the first parameter can ensure that the sequence number that is of the first time transmission unit and that is finally determined by the terminal side device is not less than the sequence number of the second time transmission unit. Compared with the foregoing embodiment in which the second parameter is added to the calculation manner of determining the first time transmission unit, the original sequence number calculation manner is not changed, and the sequence number of the first time transmission unit may be determined through searching. This reduces a calculation amount of the terminal side device and further improves the efficiency of the terminal side device while achieving a same technical effect.

In an embodiment of the fourth aspect of this application, the communication data is downlink communication data; and the method further includes:

sending, by the network side device, the communication data on the time resource included in a fifth time transmission unit, where the fifth time transmission unit includes the time resource indicated by the physical layer signaling, a sequence number of the fifth time transmission unit is less than the sequence number of the second time transmission unit, and a difference between the sequence number of the second time transmission unit and the sequence number of the fifth time transmission unit is less than N, where N is a quantity of time transmission units that are in the second frequency band and that can be stored in the terminal side device, and N≥2.

In this embodiment, for the downlink communication data sent by the network side device to the terminal side device, the network side device sends the communication data on the time resource included in the fifth time transmission unit. The sequence number of the fifth time transmission unit may be less than the sequence number of the second time transmission unit, and the difference between the sequence number of the fifth time transmission unit and the sequence number of the second time transmission unit needs to be less than the quantity of time transmission units that are in the second frequency band and that can be stored in the terminal side device. In this way, after determining the sequence number of the fifth time transmission unit, the terminal side device can obtain the stored fifth time transmission unit from a storage device of the terminal side device, and obtain, through the fifth time transmission unit, the downlink communication data on the time resource indicated by the physical layer signaling. If the terminal side device can store more time transmission units corresponding to the downlink communication data, the terminal side device may allow the downlink communication data sent by the network side device to appear in a time transmission unit prior to the second time transmission unit, and a storage capability of the terminal side device needs to be satisfied.

In an embodiment of the fourth aspect of this application, the network side device receives N sent by the terminal side device.

The network side device provided in this embodiment can receive the storage capability, namely, a capability of storing a time transmission unit in each frequency band, that is of the terminal side device and that is reported by the terminal side device. Therefore, both the network side device and the terminal side device can perform cross-carrier scheduling on the downlink communication data of the terminal side device based on the storage capability of the terminal side device, thereby avoiding a case in which a configuration of the cross-carrier scheduling exceeds the storage capability of the terminal side device.

According to a fifth aspect, this application provides a wireless communications apparatus. For beneficial effects of the apparatus provided in the following embodiments of the fifth aspect, refer to the beneficial effects brought by the corresponding embodiments of the fourth aspect. The apparatus includes a receiving module and a sending module, where the sending module is configured to send physical layer signaling to a terminal side device in a first frequency band, where the physical layer signaling is used to indicate a time resource used for communication data in a second frequency band; and the receiving module is configured to receive the communication data on the time resource included in a first time transmission unit, or the sending module is configured to send the communication data on the time transmission resource included in a first time transmission unit, where the first time transmission unit includes the time resource indicated by the physical layer signaling, a sequence number of the first time transmission unit is greater than or equal to a sequence number of a second time transmission unit in the second frequency band, an end time of the physical layer signaling is within a time range of the second time transmission unit, and a subcarrier spacing of the first frequency band is different from a subcarrier spacing of the second frequency band.

In an embodiment of the fifth aspect of this application, when the communication data is uplink communication data, a difference between the sequence number of the first time transmission unit and the sequence number of the second time transmission unit is greater than or equal to a preset positive integer threshold.

In an embodiment of the fifth aspect of this application, the first frequency band and the second frequency band are carriers; or the first frequency band and the second frequency band are bandwidth parts BWPs.

In an embodiment of the fifth aspect of this application, the sending module is further configured to: send higher layer signaling to the terminal side device, where the higher layer signaling carries at least two relative positions of the physical layer signaling of the terminal side device in a fourth time transmission unit in the first frequency band and configuration information corresponding to each relative position, the at least two pieces of configuration information are used by the terminal side device to determine first configuration information; and determine a first parameter based on the physical layer signaling and the first configuration information.

In an embodiment of the fifth aspect of this application, the sending module is configured to: send the communication data on the time resource included in a fifth time transmission unit, where the fifth time transmission unit includes the time resource indicated by the physical layer signaling, a sequence number of the fifth time transmission unit is less than the sequence number of the second time transmission unit, and a difference between the sequence number of the second time transmission unit and the sequence number of the fifth time transmission unit is less than N, where N is a quantity of time transmission units that are in the second frequency band and that can be stored in the terminal side device, and N≥2.

In an embodiment of the fifth aspect of this application, the receiving module is further configured to receive N sent by the terminal side device.

According to a sixth aspect, this application provides a base station. For beneficial effects of the base station provided in the following embodiments of the sixth aspect, refer to the beneficial effects brought by the corresponding embodiments of the fourth aspect. The base station includes a receiver and a transmitter, where the transmitter is configured to send physical layer signaling to a terminal side device in a first frequency band, where the physical layer signaling is used to indicate a time resource used for communication data in a second frequency band; and the receiver is configured to receive the communication data on the time resource included in a first time transmission unit, or the transmitter is configured to send the communication data on the time transmission resource included in a first time transmission unit, where the first time transmission unit includes the time resource indicated by the physical layer signaling, a sequence number of the first time transmission unit is greater than or equal to a sequence number of a second time transmission unit in the second frequency band, an end time of the physical layer signaling is within a time range of the second time transmission unit, and a subcarrier spacing of the first frequency band is different from a subcarrier spacing of the second frequency band.

In an embodiment of the sixth aspect of this application, when the communication data is uplink communication data, a difference between the sequence number of the first time transmission unit and the sequence number of the second time transmission unit is greater than or equal to a preset positive integer threshold.

In an embodiment of the sixth aspect of this application, the first frequency band and the second frequency band are carriers; or the first frequency band and the second frequency band are bandwidth parts BWPs.

In an embodiment of the sixth aspect of this application, the transmitter is further configured to: send higher layer signaling to the terminal side device, where the higher layer signaling carries at least two relative positions of the physical layer signaling of the terminal side device in a fourth time transmission unit in the first frequency band and configuration information corresponding to each relative position, the at least two pieces of configuration information are used by the terminal side device to determine first configuration information; and determine a first parameter based on the physical layer signaling and the first configuration information.

In an embodiment of the sixth aspect of this application, the transmitter is configured to: send the communication data on a time resource included in a sixth time transmission unit, where the sixth time transmission unit includes the time resource indicated by the physical layer signaling, a sequence number of the sixth time transmission unit is less than the sequence number of the second time transmission unit, and a difference between the sequence number of the second time transmission unit and the sequence number of the sixth time transmission unit is less than N, where N is a quantity of time transmission units that are in the second frequency band and that can be stored in the terminal side device, and N≥2.

In an embodiment of the sixth aspect of this application, the receiver is further configured to receive N sent by the terminal side device.

According to a seventh aspect, an embodiment of this application provides a resource allocation apparatus, including a processor and a memory. The memory is configured to store a program, and the processor is configured to invoke the program stored in the memory, to perform the wireless communication method according to the first aspect or any one of the embodiments of the first aspect of this application.

According to an eighth aspect, an embodiment of this application provides a resource allocation apparatus, including a processor and a memory. The memory is configured to store a program, and the processor is configured to invoke the program stored in the memory, to perform the wireless communication method according to any one of the fourth aspect or the embodiments of the fourth aspect of this application.

According to a ninth aspect, an embodiment of this application provides a computer-readable storage medium. The computer-readable storage medium stores program code, and when the program code is executed, the wireless communication method according to any one of the first aspect or the embodiments of the first aspect of this application is performed.

According to a tenth aspect, an embodiment of this application provides a computer-readable storage medium. The computer-readable storage medium stores program code, and when the program code is executed, the wireless communication method according to any one of the fourth aspect or the embodiments of the fourth aspect of this application is performed.

DESCRIPTION OF EMBODIMENTS

Figure 1:
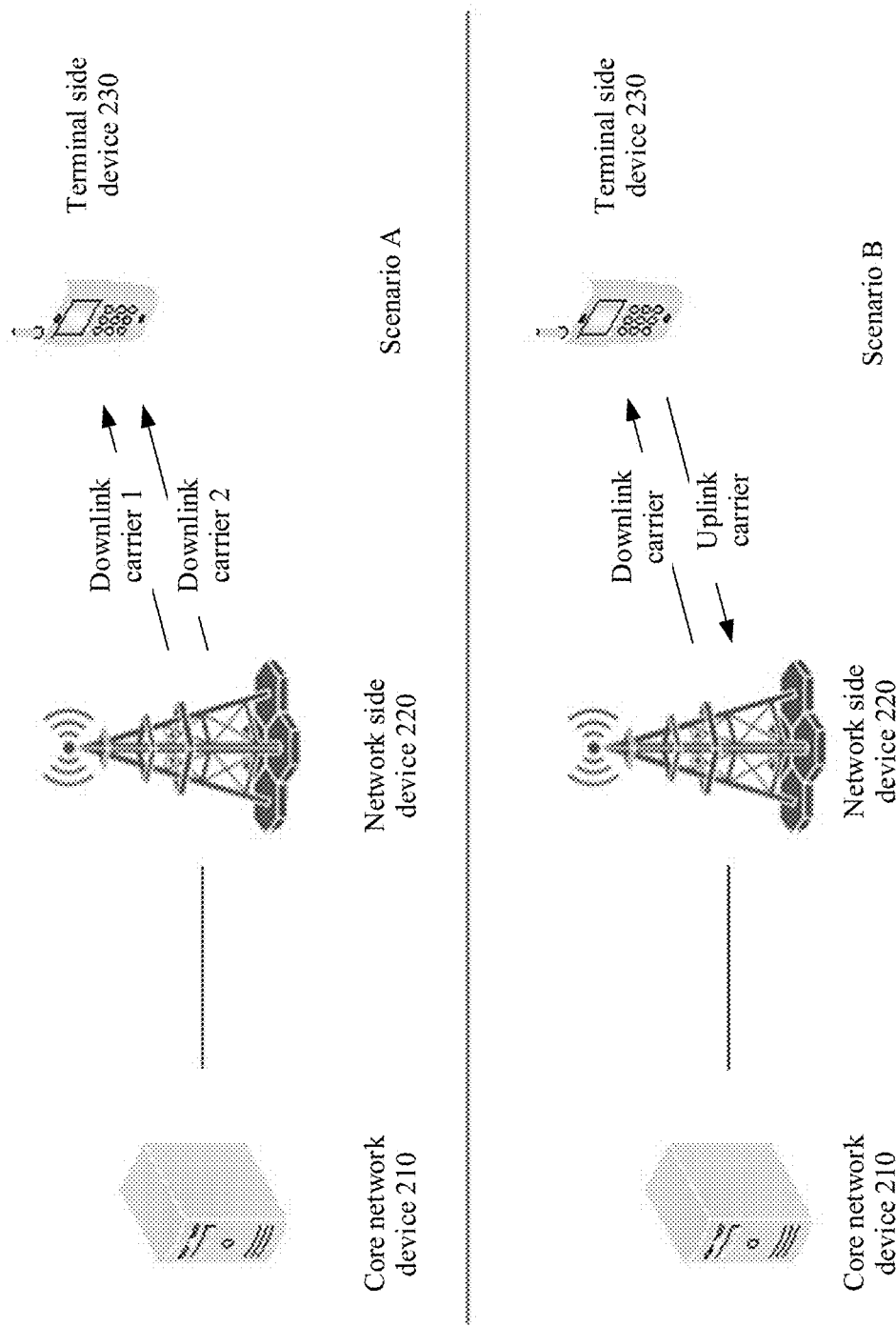
FIG. 1 is a schematic architectural diagram of a communications system to which an embodiment of this application is applied.

FIG. 1 is a schematic architectural diagram of a communications system to which an embodiment of this application is applied. As shown in FIG. 1, the communications system includes a core network device 210, a network side device 220, and at least one terminal side device (for example, a terminal side device 230 in FIG. 1). The terminal side device is connected to the network side device in a wireless manner, and the network side device is connected to the core network device in a wireless or wired manner. The core network device and the network side device may be different independent physical devices, or a function of the core network device and a logical function of the network side device may be integrated into a same physical device to serve as a network side device together, or some functions of the core network device and some functions of the network side device may be integrated into one physical device. However, when the communications system has a 5G RAN structure, a centralized unit (CU) and a distributed unit (DU) may be independently deployed to better satisfy application requirements in all communication scenarios. The terminal side device may be located at a fixed position, or may be movable. FIG. 1 is merely a schematic diagram. The communications system may further include another network side device, for example, may further include a wireless relay device and a wireless backhaul device, which are not drawn in FIG. 1. Quantities of core network devices, network side devices, and terminal side devices included in the mobile communications system are not limited in the embodiments of this application.

The network side device is an access device used by the terminal side device to access the mobile communications system in a wireless manner, and may be a base station, for example, a NodeB in a 3G communications system, an evolved NodeB eNodeB in an LTE communications system, a gNodeB gNodeB or gNB in a 5G mobile communications system, a base station in a future mobile communications system, or an access node in a wireless fidelity (WiFi) system. A specific technology and a specific device form used by an access network device are not limited in the embodiments of this application.

The terminal side device may also be referred to as a terminal, a device on a terminal side, user equipment (UE), a mobile station (MS), a mobile terminal side device (MT), or the like. The terminal side device may be a mobile phone, a tablet (Pad), a computer having wireless reception and transmission functions, a virtual reality (VR) terminal side device, an augmented reality (AR) terminal side device, a wireless terminal side device in industrial control, a wireless terminal side device in self driving, a wireless terminal side device in remote surgery, a wireless terminal side device in a smart grid, a wireless terminal side device in transportation safety, a wireless terminal side device in a smart city, a wireless terminal side device in a smart home, or the like.

The network side device and the terminal side device may be deployed on land, where the deployment includes indoor, outdoor, handheld, or vehicle-mounted deployment; or may be deployed on water; or may be deployed on an aircraft, a balloon, and a satellite in air. Application scenarios of the network side device and the terminal side device are not limited in the embodiments of this application.

The embodiments of this application may be applied to downlink signal transmission, or may be applied to uplink signal transmission, or may be applied to device-to-device (D2D) signal transmission. For the downlink signal transmission, a sending device is a network side device, and a corresponding receiving device is a terminal side device. For the uplink signal transmission, a sending device is a terminal side device, and a corresponding receiving device is a network side device. For the D2D signal transmission, a sending device is a terminal side device, and a corresponding receiving device is also a terminal side device. A signal transmission direction is not limited in the embodiments of this application.

Communication between the network side device and the terminal side device and communication between terminal side devices may be performed by using a licensed spectrum, an unlicensed spectrum, or both a licensed spectrum and an unlicensed spectrum. A spectrum resource used between the network side device and the terminal side device and a spectrum resource used between the terminal side devices may be, for example, a 4G spectrum or a 5G spectrum. The spectrum resource used between the network side device and the terminal side device is not limited in the embodiments of this application.

A cross-carrier scheduling manner in carrier aggregation is defined in a technical specification (TS), for example, the 38.214 protocol, of the 3rd generation partnership project (3GPP). The terminal side device can obtain downlink control information (DCI) from a physical downlink control channel (PDCCH) transmitted on a scheduling carrier sent by the network side device, and transmit a physical downlink shared channel (PDSCH)/physical uplink shared channel (PUSCH) of the terminal side device on the carrier and/or another scheduled carrier based on scheduling information of the DCI, so that radio resource utilization efficiency is improved.

For example, in the two working manners of the communications system shown in FIG. 1, the radio access network device and the terminal side device may communicate with each other on at least two downlink carriers. In a scenario A, a PDCCH carrying DCI is sent on a downlink carrier 1 in FIG. 1, a PDSCH scheduled by using the DCI is sent on a downlink carrier 2, and subcarrier spacings of the PDCCH and the PDSCH are different. Alternatively, in a scenario B, the radio access network device and the terminal side device may communicate with each other on at least one downlink carrier and one uplink carrier. A PDCCH carrying DCI is sent on the downlink carrier, a PUSCH scheduled by using the DCI is sent on the uplink carrier, and subcarrier spacings of the PDCCH and the PDSCH are different.

Figure 2:
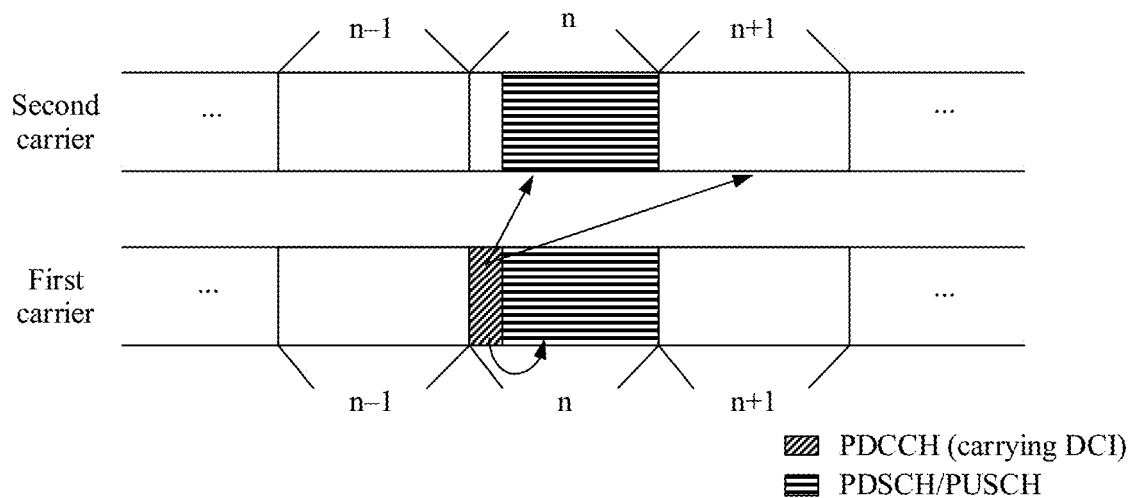
FIG. 2 is a schematic structural diagram of time transmission units in cross-carrier scheduling.

FIG. 2 is a schematic structural diagram of time transmission units in cross-carrier scheduling. Specifically, a slot is used as an example for time transmission units, shown in FIG. 2, that are of a first carrier and a second carrier and that are arranged in a transverse time sequence. In addition, it should be noted that the time transmission unit in the embodiments of this application is described by using a slot as an example, and is not intended to limit specific composition of the time transmission unit.

As shown in FIG. 2, each slot includes a communication resource, such as a time resource or a frequency resource that can be used to transmit a PDCCH, a PDSCH, or a PUSCH. In each carrier, starting from the first slot, slot sequence numbers in ascending order are allocated in a chronological order, and the slot sequence numbers are specifically distributed as a slot 0, a slot 1, a slot 2, . . . , and a slot N in the carrier, so that both a network side device and a terminal side device can determine a corresponding slot based on the sequence number when communicating with each other. A PDCCH is used to carry DCI, and the DCI is used to indicate: a sequence number of a slot in which a communication resource is located, where the communication resource is of a PDSCH or a PUSCH and is used to transmit communication data of the terminal side device; and related control information, such as a modulation and coding scheme, of the communication resource of the PDSCH or the PUSCH. In this way, the terminal side device can process PDSCH/PUSCH data in a corresponding slot based on the slot sequence number indicated by the DCI.

To improve communication efficiency, the communication data can be transmitted between the network side device and the terminal side device in a carrier aggregation manner. For example, in FIG. 2, communication data of a same terminal side device can be simultaneously transmitted in a slot having a sequence number n of the first carrier and a slot having a sequence number n of the second carrier. In a conventional carrier aggregation method, a first PDCCH needs to be transmitted in the slot n of the first carrier, and a second PDCCH further needs to be transmitted in the slot n of the second carrier. DCI carried on the first PDCCH is used to indicate a communication resource for transmitting a PDSCH/PUSCH in the slot n of the first carrier, and DCI carried by the second PDCCH is used to indicate a communication resource for transmitting a PDSCH/PUSCH in the slot n of the second carrier.

However, a more efficient cross-carrier scheduling manner is defined in the LTE 3GPP TS 36.214 protocol for carrier aggregation. As shown in FIG. 2, when the network side device and the terminal side device transmit uplink and/or downlink communication data of the terminal side device on the first carrier and the second carrier in the carrier aggregation manner, DCI needs to be carried on a PDCCH transmitted in the slot n of the first carrier. The DCI may be used to schedule the communication resource in the slot n of the first carrier to transmit the PDSCH/PUSCH, and may further be used to schedule the communication resource in the slot n of the second carrier to transmit the PDSCH/PUSCH. Therefore, after obtaining, through parsing, the DCI from the PDCCH transmitted in the slot n of the first carrier, the terminal side device determines a slot sequence number indicated by the DCI, and processes PDSCH/PUSCH data on the communication resources that are indicated by the DCI and that are in the slot n of the first carrier and the slot n of the second carrier.

Figure 3:
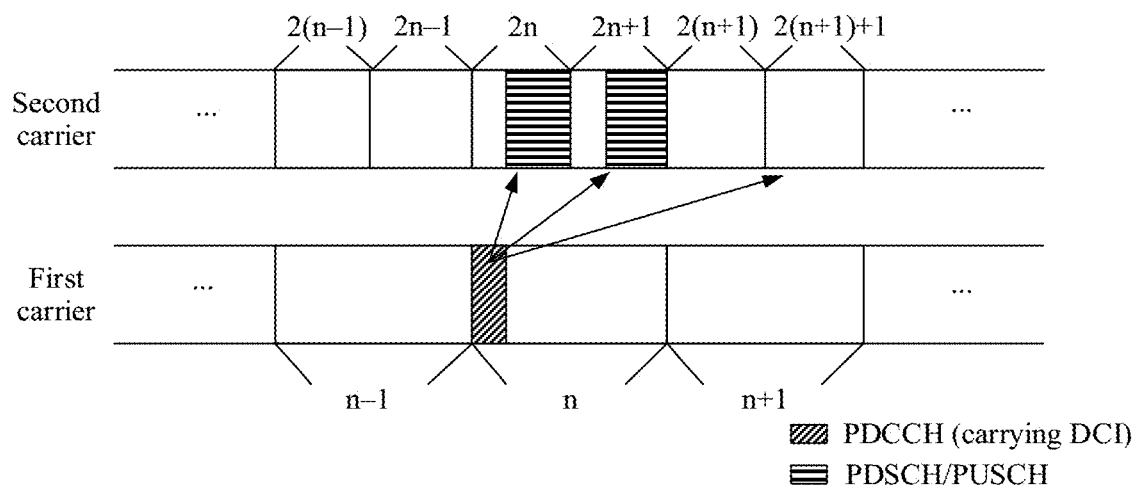
FIG. 3 is a schematic structural diagram of time transmission units of carriers having different subcarrier spacings in cross-carrier scheduling.

Further, in the 5G NR protocol, the cross-carrier scheduling shown in FIG. 2 can be implemented, and a solution in which cross-carrier scheduling is performed when subcarrier spacings of the first carrier and the second carrier are different is further introduced. FIG. 3 is a schematic structural diagram of time transmission units of carriers having different subcarrier spacings in cross-carrier scheduling. When a network side device communicates with a terminal side device, a PDCCH in a slot n of a first carrier carries DCI, and the terminal side device needs to determine, based on indication information of the DCI, a sequence number of a slot that is of a second carrier and in which a PDSCH/PUSCH scheduled by using the DCI is located. Specifically:

When the DCI is used to schedule the PDSCH, the sequence number of the slot for transmitting the PDSCH on the second carrier is calculated by using a formula $$\left\lfloor n \cdot \frac{2^{\mu PDSCH}}{2^{\mu PDCCH}} \right\rfloor + K_0,$$

where n is the sequence number of the slot that is of the first carrier and in which the PDCCH carrying the DCI is located, μPDSCH is a subcarrier spacing configuration of the second carrier used to transmit the PDSCH, μPDCCH is a subcarrier spacing configuration of the first carrier used to transmit the PDCCH, $$\left\lfloor n \cdot \frac{2^{\mu PDSCH}}{2^{\mu PDCCH}} \right\rfloor$$

is used to calculate a sequence number that is of a reference slot of the second carrier and that corresponds to a start time of the slot n of the first carrier, and $K_0$ is a PDCCH-PDSCH slot offset, used to determine a difference between the sequence number of the slot for transmitting the PDSCH and the sequence number of the reference slot.

More specifically, a subcarrier spacing offset μ may be calculated by using a formula $\Delta f = 2^{\mu} \cdot 15$ [kHz] according to a definition in 3GPP TS 38.211, where Δf is a subcarrier spacing of a carrier, and common subcarrier spacings include 15 kHz, 30 kHz, 60 kHz, and the like. When the terminal side device determines the slot offset $K_0$, the following step is specifically included: The terminal side device obtains a PDSCH-time domain resource allocation list from higher layer signaling that is used to configure the PDSCH and that is configured by the network side device, where the list includes a correspondence between an index and the PDCCH-PDSCH slot offset $K_0$. The terminal side device further obtains an index value of one index by using a time domain resource assignment of physical layer signaling, e.g. the DCI, carried on the PDCCH. Then, the terminal side device obtains, from the table PDSCH-time domain resource allocation list, $K_0$ corresponding to the index, to calculate the slot sequence number of the PDSCH. In addition, when the terminal side device receives an index and needs to search for a corresponding $K_0$, if the terminal side device does not receive the list from the higher layer signaling, the terminal side device determines $K_0$ based on the index and a default list.

When the DCI is used to schedule the PUSCH, the sequence number of the slot for transmitting the PUSCH on the second carrier is calculated by using a formula $$\left\lfloor n \cdot \frac{2^{\mu PUSCH}}{2^{\mu PDCCH}} \right\rfloor + K_2,$$

where n is the sequence number of the slot that is of the first carrier and in which the PDCCH carrying the DCI is located, μPUSCH is a subcarrier spacing configuration of the second carrier used to transmit the PUSCH, μPDCCH is a subcarrier spacing configuration of the first carrier used to transmit the PDCCH, $$\left\lfloor n \cdot \frac{2^{\mu PUSCH}}{2^{\mu PDCCH}} \right\rfloor$$

is used to calculate a sequence number that is of a slot of the second carrier and that corresponds to a start time of the slot n of the first carrier, and $K_2$ is a PDCCH-PUSCH slot offset, used to determine a difference between the sequence number of the slot for transmitting the PUSCH and the sequence number of the slot. A manner of calculating a subcarrier spacing offset μ is the same as that described above. A manner of determining $K_2$ is the same as that of determining $K_0$. A difference lies in that $K_2$ is determined in the PUSCH-time domain resource allocation list based on an index, and a manner of obtaining the table is the same as that described above.

For example, in FIG. 3, a subcarrier spacing of the second carrier is twice a subcarrier spacing of the first carrier. For the two carriers for carrier aggregation, time synchronization is ensured because the two carriers are sent from a same network side device. Therefore, a time range of one slot of the first carrier corresponds to two slots of the second carrier. It is assumed that the subcarrier spacing of the first carrier is 15 kHz, and the subcarrier spacing of the second carrier is 30 kHz. Based on a calculation manner in the protocol, the subcarrier spacing offset μ of the first carrier is 0, and the subcarrier spacing offset μ of the second carrier is 1. Therefore, it can be obtained, through calculation according to the foregoing formula, that the sequence number that is of the slot of the second carrier and that corresponds to the start time of the slot n of the first carrier is 2n. Further, the sequence number $2n+K_0$ of the slot for transmitting the PDSCH on the second carrier is calculated when the PDSCH is indicated by the DCI, or the sequence number $2n+K_2$ of the slot for transmitting the PUSCH on the second carrier is calculated when the PUSCH is indicated by the DCI. Therefore, after determining the sequence number of the slot for transmitting the PDSCH/PUSCH on the second carrier, the terminal side device may process PDSCH data in the slot $2n+K_0$, or process PUSCH data in the slot $2n+K_2$. Finally, cross-carrier scheduling between the carriers having the different subcarrier spacings is implemented.

Figure 4:
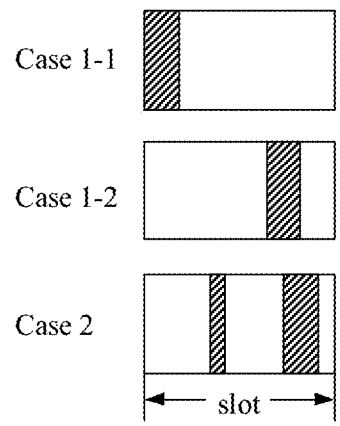
FIG. 4 is a schematic structural diagram of a position at which a PDCCH may appear in a time transmission unit.
Figure 5:
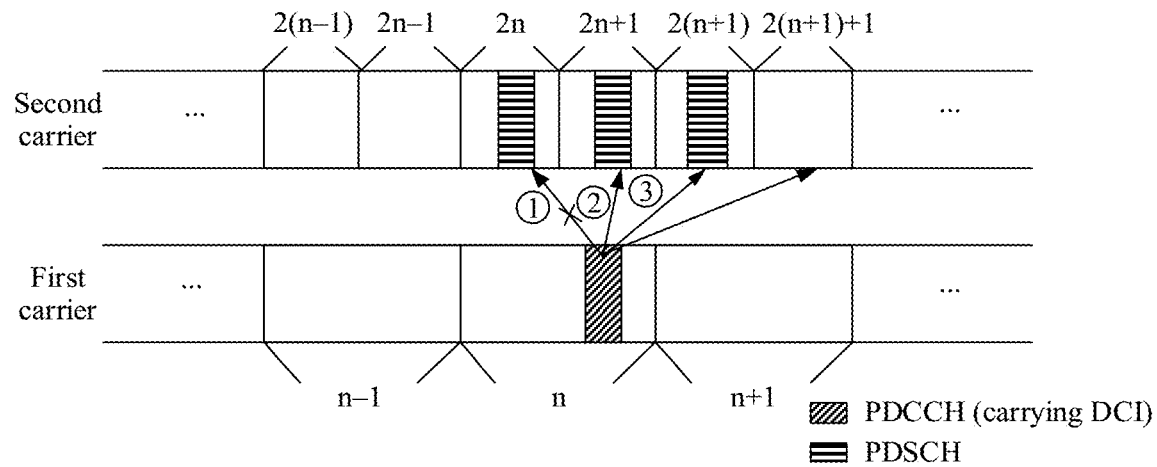
FIG. 5 is a schematic structural diagram of a time transmission unit on a cross-carrier scheduled PDSCH.

However, in the foregoing solution, when the terminal side device determines, in the DCI carried on the PDCCH on the first carrier, the sequence number of the slot for transmitting the PDSCH/PUSCH data on the second carrier, the sequence number of the slot is obtained by adding the sequence number 2n that is of the slot of the second carrier and that corresponds to the start time of the slot n of the first carrier to the slot offset $K_0$ or $K_2$, a minimum value of K may be 0, and a minimum value of $K_2$ may be 1. Therefore, when the PDSCH data is transmitted, the terminal side device can determine that the first slot that can be scheduled by using the DCI on the second carrier in a cross-carrier scheduling manner is the slot 2n. When the PUSCH data is transmitted, the terminal side device can determine that the first slot that can be scheduled by using the DCI on the second carrier in a cross-carrier scheduling manner is the slot 2n+1. That a PDCCH carrying DCI may appear at any position in one time transmission unit (which may be a slot in the foregoing example) is further defined in the 3GPP protocol RAN1 #93. FIG. 4 is a schematic structural diagram of a position at which a PDCCH carrying DCI may appear in a slot. To be specific, current PDCCH monitoring modes include a case 1 (including a case 1-1 and a case 1-2) and a case 2. In this case, when the PDCCH that carries the DCI and that is obtained by the terminal side device on the first carrier is in case 1-2 mode and case 2 mode, it means that the terminal side device may obtain, at any time of the slot, the DCI carried on the PDCCH. As a result, even if the terminal side device obtains, in the last part of the slot n of the first carrier shown in FIG. 3, the DCI carried on the PDCCH, the DCI can still be used to schedule a resource in the slot 2n of the second carrier to transmit the communication data of the PDSCH of the terminal side device, or schedule a resource in the slot 2n+1 of the second carrier to transmit the communication data of the PUSCH of the terminal side device. This causes the following impact on communication of the terminal side device:

For DCI for scheduling a PDSCH, FIG. 5 is a schematic structural diagram of a time transmission unit on a cross-carrier scheduled PDSCH. As shown in FIG. 5, because a subcarrier spacing of a second carrier is twice a subcarrier spacing of a first carrier, a time range of one slot of the first carrier corresponds to two slots of the second carrier. However, DCI carried on a PDCCH in a slot n of the first carrier can implement PDSCH scheduling marked by ① to ③ in the figure. To be specific, all of a slot 2n, a slot 2n+1, and a slot 2(n+1) of the second carrier may be scheduled to transmit PDSCH data of a terminal side device. However, an end time of the PDCCH in the slot n of the first carrier in the figure corresponds to the slot 2n+1 of the second carrier. After the terminal side device obtains the DCI, although the DCI indicates that a communication resource is in the slot 2n, the terminal side device cannot return to a time of the previous slot 2n to process the communication data in the slot 2n.

In addition, in the prior art, to obtain downlink communication data in a slot that is of a scheduled carrier and that has a same time as a slot in which DCI is located in cross-carrier scheduling, the terminal side device stores only data of one slot or a slot that is slightly greater than one slot of the scheduled carrier, to obtain, after obtaining the DCI from a scheduling carrier, the downlink data from the slot that is of the scheduled carrier and that corresponds to the same time. To be specific, as shown in FIG. 5, when the terminal side device obtains the DCI in the second half of the slot n of the first carrier, a sequence number of a slot that is of the second carrier and that corresponds to a time in this case is 2n+1. In this case, the terminal side device stores data of the slot 2n+1 of the second carrier. After obtaining the DCI from the slot n of the first carrier, the terminal side device obtains, from the slot 2n+1 that is of the second carrier and that is stored in storage space, the PDSCH indicated by the DCI.

However, in cross-carrier scheduling of different subcarrier spacings, in the example shown in FIG. 5, the terminal side device still stores data of one slot of the second carrier. Because both the slot 2n and the slot 2n+1 of the second carrier may be scheduled to transmit the PDSCH data of the terminal side device, the terminal side device needs to store, before an end time of the slot n of the first carrier, the data of the slot 2n+1 that is of the second carrier and that corresponds to the end time, and further needs to store data of the slot 2n of the second carrier. Therefore, after the terminal side device obtains, from the second half of the slot n of the first carrier, the DCI carried on the PDCCH, the terminal side device can still obtain the PDSCH data from the stored slot 2n of the second carrier even if a corresponding time of the second carrier in this case is the slot 2n+1. However, the terminal side device does not expect the PDSCH resource indicated by the DCI to be, for example, in a slot whose sequence number is 2n in the figure, on the first carrier, that is, does not expect a scheduling scheme whose sequence number is ① in the figure.

To be specific, when the downlink resource of the terminal side device is cross-carrier scheduled, and the subcarrier spacing of the second carrier is twice or more times the subcarrier spacing of the first carrier, in addition to data of one slot of the second carrier, the terminal side device further needs to store slots of the second carrier as many as possible, for example, data of two, four, or eight slots of the second carrier (where a quantity of slots is determined based on the subcarrier spacings of the first carrier and the second carrier). In this way, it is ensured that the PDSCH indicated by the DCI can be obtained from the slot of the first carrier, where the slot is stored in the terminal side device and is before a time after the terminal side device obtains the PDCCH from the slot of the first carrier and obtains the DCI through parsing. This brings relatively high overheads to a storage function of the terminal side device, and greatly reduces storage efficiency and communication efficiency of the terminal side device.

Figure 6:
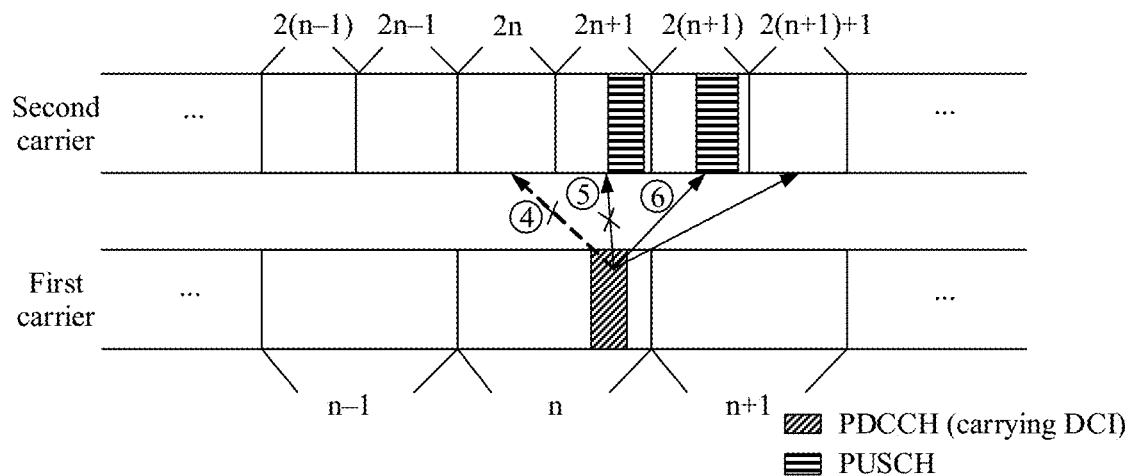
FIG. 6 is a schematic structural diagram of a time transmission unit on a cross-carrier scheduled PUSCH.

For DCI for scheduling a PUSCH, FIG. 6 is a schematic structural diagram of a time transmission unit on a cross-carrier scheduled PDSCH. As shown in FIG. 6, a subcarrier spacing of a second carrier is twice a subcarrier spacing of a first carrier. A time range of one slot of the first carrier corresponds to two slots of the second carrier. An end time of a PDCCH in a slot n in a first frequency band corresponds to a slot 2n+1 in a second frequency band. Although in an existing protocol, scheduling marked as ④ in the figure has been avoided, DCI carried on the PDCCH in the slot n of the first carrier can still be used to implement PUSCH scheduling marked as ⑤ and ⑥ in the figure. To be specific, both the slot 2n+1 and a slot 2(n+1) of the second carrier may be scheduled to transmit PDSCH data of a terminal side device. After obtaining the DCI carried on the PDCCH in the slot n of the first carrier, the terminal side device further needs to perform rate de-matching, decoding, radio network temporary identity (RNTI) descrambling, cyclic redundancy check (CRC), and the like on the DCI, to obtain, through parsing, a PUSCH resource indicated by the DCI. However, when the terminal side device obtains, through parsing, that a sequence number that is of a slot used to send the PUSCH on the second carrier and that is indicated by the DCI is 2n+1, a corresponding slot sequence number on the second carrier may have reached 2(n+1). Although the DCI indicates that an uplink communication resource used to send the PUSCH is in the slot 2n+1, the terminal side device cannot return to a time of the previous slot 2n+1 to send PUSCH data on the resource in the slot 2n+1. As a result, the terminal side device has missed the time that is for sending the uplink data on the PUSCH resource and that is indicated by the DCI. Therefore, the terminal side device does not expect the PUSCH resource indicated by the DCI to be, for example, in a slot whose sequence number is 2n+1 in the figure, on the first carrier, that is, does not expect a scheduling scheme whose sequence number is ⑤ in the figure.

That is, when the uplink resource of the terminal side device is cross-carrier scheduled, scheduling indicated by the DCI on the first carrier does not reserve, for the terminal side device, a time for obtaining the DCI through parsing and preparation processing for preparing the uplink data to be sent on the PUSCH resource on the second carrier. In this case, the terminal side device may not have enough time to send the PUSCH on resources that are in some slots of the second carrier and that are indicated by the DCI. However, as indicated by the DCI, the some resources are still configured to send the PUSCH. Consequently, a waste of radio resources is caused, and communication efficiency of the terminal side device is further reduced.

Therefore, in conclusion, in this application, the terminal side device considers a relationship between an end position of the DCI on the first carrier and the slot in which the DCI is located on the second carrier, and determines the slot that is of the second carrier and that is used to transmit the PDSCH/PUSCH indicated by the DCI, to improve the communication efficiency of the terminal side device during cross-carrier communication.

Figure 7:
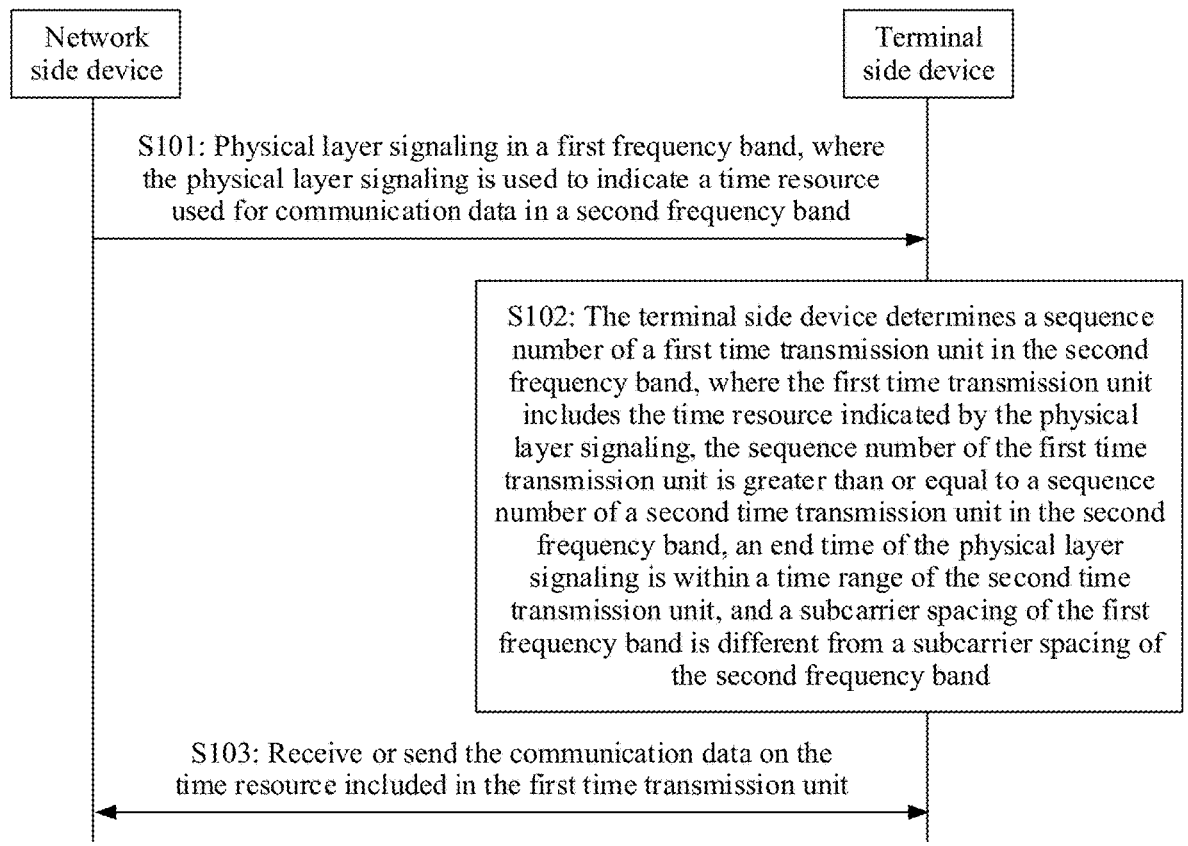
FIG. 7 is a schematic flowchart of an embodiment of a wireless communication method according to this application.

Specifically, FIG. 7 is a schematic flowchart of an embodiment of a wireless communication method according to this application. As shown in FIG. 7, the wireless communication method according to this embodiment of this application includes the following steps.

S101: A terminal side device receives physical layer signaling sent by a network side device in a first frequency band, where the physical layer signaling is used to indicate a time resource used for communication data in a second frequency band.

Specifically, an entity, namely, the terminal side device for performing S101 may be a device on a terminal side. The terminal side device may receive, by using, for example, a radio signal receiving module built in the terminal side device, the physical layer signaling sent by the network side device, for example, a base station, through an air interface. The terminal side device receives, in the first frequency band, the physical layer signaling sent by the network side device, and the physical layer signaling is used to indicate the time resource used for the communication data in the second frequency band.

The communication data indicated by the physical layer signaling received by the terminal side device is communication data of the terminal side device. Specifically, when the communication data is downlink communication data that needs to be received by the terminal side device, the physical layer signaling is used to indicate the terminal side device to obtain a time resource for the downlink communication data sent by the network side device. When the communication data is uplink communication data that needs to be sent by the terminal side device, the physical layer signaling is used to indicate a time resource used by the terminal side device to send the uplink communication data to the network side device.

In addition, the physical layer signaling may further include other control information, for example, control information such as a frequency resource and a modulation and coding scheme, of the communication data in the second frequency band. Preferably, the physical layer signaling in this embodiment may be DCI that is carried on a PDCCH and that is sent by the network side device to the terminal side device. In this case, the terminal side device receives the PDCCH that is sent by the network side device in the first frequency band, and obtains, by parsing the DCI carried on the PDCCH, the time resource that is used for the communication data in the second frequency band and that is indicated by the DCI.

Optionally, in this embodiment, when the terminal side device receives the physical layer signaling sent by the network side device, the network side device and the terminal side device may be in a 5G RAN communications system, and a structure of the system may use a manner in which a central unit (CU) or a distributed unit (DU) is independently deployed. This is not specifically limited in this embodiment.

Optionally, in this embodiment, both the first frequency band and the second frequency band are carriers. In this case, the terminal side device obtains the physical layer signaling from the first carrier sent by the network side device, and the physical layer signaling is used to indicate the time resource used by the terminal side device to receive, on the second carrier, the downlink communication data sent by the network side device, or is used to indicate the time resource used by the terminal side device to send the uplink communication data to the network side device on the second carrier.

Alternatively, optionally, in this embodiment, the first frequency band and the second frequency band are bandwidth parts (BWP). Specifically, if the network side device and the terminal side device in this embodiment are deployed in a 5G communications system and use the NR protocol, when the network side device communicates with the terminal side device, one uplink BWP or one downlink BWP is activated on each carrier, a bandwidth of the downlink BWP is less than or equal to a bandwidth of a downlink carrier, and a bandwidth of the uplink BWP is less than or equal to a bandwidth of an uplink carrier.

The BWP is a bandwidth part, and may also be referred to as a bandwidth adaptation change Bandwidth Adaptation. The BWP is introduced in the NR protocol of the 5G communications system, and an objective is to enable a bandwidth of the terminal side device to dynamically change. For example, at a first moment, when a service volume of the terminal side device is relatively large, the communications system may configure a BWP 1 having a high bandwidth for the terminal side device; at a second moment, when a service volume of the terminal side device is relatively small, the communications system may configure a BWP 2 having a low bandwidth for the terminal side device, to satisfy a basic communication requirement; at a third moment, if the communications system finds that a large range of frequency selective fading exists in the bandwidth in which the BWP 1 is located, or a resource in a frequency range in which the BWP 1 is located is relatively insufficient, the communications system configures anew bandwidth (BWP 3) for the terminal side device. In this way, an uplink resource or a downlink resource does not need to be configured completely based on a bandwidth of each frequency band, thereby implementing flexible configuration of a resource used by the terminal side device.

Therefore, the terminal side device may configure a BWP having one or more carriers in a downlink communication resource, and the terminal side device does not expect to receive a PDSCH or a PDCCH on a resource other than an active BWP in the downlink communication resource. The terminal side device may alternatively configure a BWP having one or more carriers in an uplink communication resource, and the terminal side device does not expect to send a PUSCH or a PUCCH on a resource other than an active BWP in the uplink communication resource. In this embodiment, the terminal side device obtains the physical layer signaling from a first downlink BWP sent by the network side device, and the physical layer signaling is used to indicate the time resource used by the terminal side device to receive, in a second downlink BWP, the downlink communication data sent by the network side device, or is used to indicate the time resource used by the terminal side device to send the uplink communication data to the network side device in a second uplink BWP.

S102: The terminal side device determines a sequence number of a first time transmission unit in the second frequency band, where the first time transmission unit includes the time resource indicated by the physical layer signaling, the sequence number of the first time transmission unit is greater than or equal to a sequence number of a second time transmission unit in the second frequency band, an end time of the physical layer signaling is within a time range of the second time transmission unit, and a subcarrier spacing of the first frequency band is different from a subcarrier spacing of the second frequency band.

Specifically, after receiving, in S101, the physical layer signaling that indicates the time resource used for the communication data in the second frequency band, the terminal side device needs to determine, in the second frequency band, the sequence number of the first time transmission unit in which the time resource indicated by the physical layer signaling is located. The corresponding first time transmission unit is determined based on the sequence number of the first time transmission unit, and then the communication data can be received or sent on the time resource in the first time transmission unit.

Figure 8:
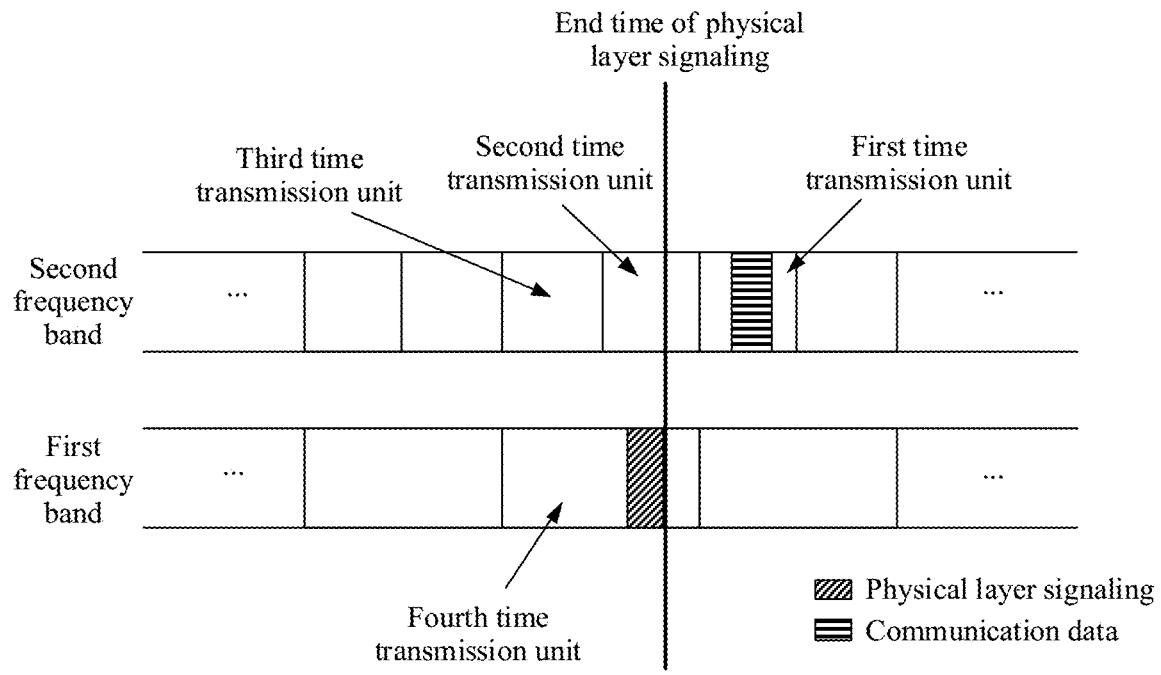
FIG. 8 is a schematic structural diagram of an embodiment of a time transmission unit according to this application.

FIG. 8 is a schematic structural diagram of an embodiment of a time transmission unit according to this application. As shown in FIG. 8, the first time transmission unit in this embodiment is located in the second frequency band, and the time resource that is used for the communication data in the second frequency band and that is indicated by a physical layer obtained by the terminal side device in S101 is located in the first transmission unit. In addition, the subcarrier spacing of the first frequency band is different from the subcarrier spacing of the second frequency band. In an example shown in FIG. 8, the subcarrier spacing of the second frequency band is twice the subcarrier spacing of the first frequency band. The end time of the physical layer signaling in the first frequency band is correspondingly within a time range of the second time transmission unit in the second frequency band. The sequence number that is of the first time transmission unit and that is determined by the terminal side device in S102 is greater than or equal to the sequence number of the second time transmission unit in the second frequency band, that is, the sequence number of the first time transmission unit cannot be less than the sequence number of the second time transmission unit.

In the example shown in FIG. 8, only that the sequence number of the first time transmission unit—the sequence number of the second time transmission unit=1 is used as an example. When the sequence number of the first time transmission unit is equal to the sequence number of the second time transmission unit in the second frequency band, the first time transmission unit determined by the terminal side device is also the second time transmission unit shown in the figure. Alternatively, when the sequence number of the first time transmission unit is greater than the sequence number of the second time transmission unit in the second frequency band, the first time transmission unit determined by the terminal side device may be any time transmission unit after the second time transmission unit in the second frequency band in the figure.

Further, when the communication data is the uplink communication data, a difference between the sequence number that is of the first time transmission unit and that is determined by the terminal side device in S102 and the sequence number of the second time transmission unit is greater than or equal to a preset positive integer threshold. Specifically, after obtaining the physical layer signaling on the first carrier, the terminal side device further needs to perform operations such as parsing and checking on the physical layer signaling, to obtain, through parsing, the time resource indicated by the physical layer signaling. Therefore, when the terminal side device determines the sequence number of the first time transmission unit in which the time resource used for the uplink communication data in the second frequency band is located, the terminal side device needs to reserve, after the end time of the physical layer signaling, a time in which the terminal side device obtains and parses the physical layer signaling. The sequence number of the time transmission unit is reflected. As shown in the example in FIG. 8, the end time of the physical layer signaling in the first frequency band is correspondingly within the time range of the second time transmission unit in the second frequency band. In this case, the difference between the sequence number of the first time transmission unit and the sequence number of the second transmission unit is set to a positive integer threshold, to ensure that the terminal side device can completely obtain the physical layer signaling through parsing, and prepare to send the uplink communication data on the time resource indicated by the physical layer. Optionally, the threshold may be adjusted based on factors such as a computing capability of the terminal side device and a communication environment of the terminal side device.

Figure 9:
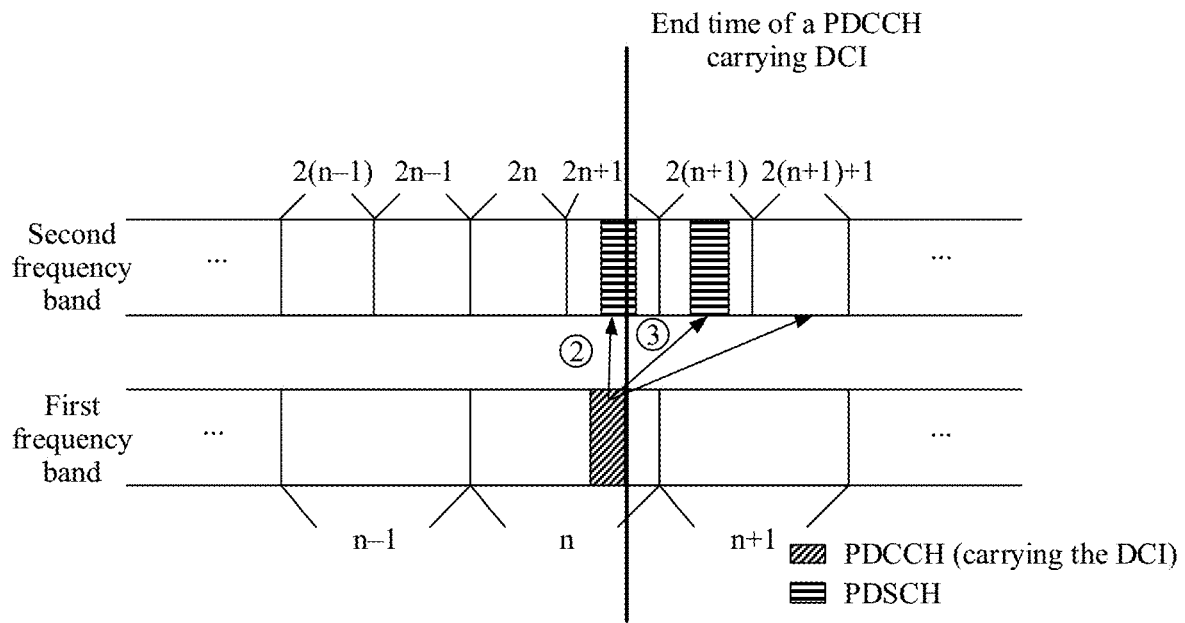
FIG. 9 is a schematic structural diagram of an embodiment of a time transmission unit according to this application.

More specifically, if the communication data in this embodiment is the downlink communication data, for example, a PDSCH, of the terminal side device, the physical layer signaling is DCI carried on a PDCCH. FIG. 9 is a schematic structural diagram of an embodiment of a time transmission unit according to this application. As shown in FIG. 9, a subband spacing of the second frequency band is twice a subband spacing of the first frequency band, and a time range of one slot of the first frequency band corresponds to two slots in the second frequency band. In this embodiment, DCI carried on a PDCCH in a slot n in the first frequency band can be used to implement PDSCH scheduling marked by ② and ③ in the figure and PDSCH scheduling in a slot after a slot whose sequence number is 2(n+1) in the figure. As shown in FIG. 8, an end time of the PDCCH in the slot n in the first frequency band corresponds to a slot 2n+1 in the second frequency band. Therefore, even if the terminal side device obtains, from the second half of the slot n in the first frequency band, the DCI carried on the PDCCH, the terminal side device can directly obtain PDSCH data from the slot 2n+1 that is in the second frequency band and that corresponds to an end time of the DCI. In this way, there is no need to store and obtain, from storage space, more slots other than the first slot before the end time of the DCI, so that when the terminal side device processes the downlink data, a storage requirement and overheads for the slot before the DCI is obtained are reduced, and a PDSCH scheduling manner marked by ① in the comparison figure FIG. 5 is avoided. Therefore, storage efficiency and communication efficiency of the terminal side device are improved.

Figure 10:
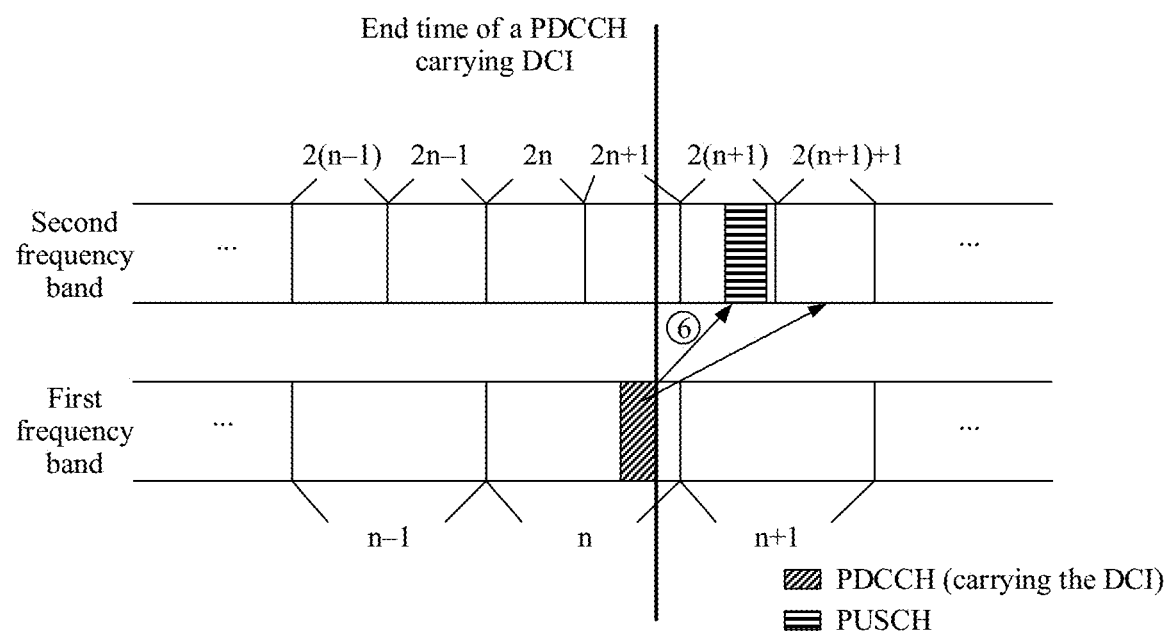
FIG. 10 is a schematic structural diagram of an embodiment of a time transmission unit according to this application.

If the communication data in this embodiment is the uplink communication data, for example, a PUSCH, of the terminal side device, the physical layer signaling is DCI carried on a PDCCH. FIG. 10 is a schematic structural diagram of an embodiment of a time transmission unit according to this application. As shown in FIG. 10, a subband spacing of the second frequency band is twice a subband spacing of the first frequency band. A time range of one slot in the first frequency band corresponds to two slots in the second frequency band. An end time of a PDCCH in a slot n in the first frequency band corresponds to a slot 2n+1 in the second frequency band. In this embodiment, DCI carried on the PDCCH in the slot n in the first frequency band can be used to implement PUSCH scheduling marked by ⑥ in the figure and PUSCH scheduling in a slot after a slot whose sequence number is 2(n+1) in the figure. Therefore, even if the terminal side device obtains, from the second half of the slot n in the first frequency band, the DCI carried on the PDCCH, a reserved time interval further exists for performing operations such as parsing and checking on the DCI, then determining a PUSCH resource indicated by the DCI, and preparing for sending a PUSCH in the slot 2 (n+1) in which the PUSCH resource indicated by the DCI is located. Therefore, it is ensured that the configured PUSCH resource can be used after the terminal side device obtains the DCI through parsing, so that a case in which when processing uplink data, the terminal side device has no enough time to send the PUSCH in a slot before the DCI is obtained is reduced, and the PUSCH scheduling manner marked by ⑤ in FIG. 6 is avoided, thereby further improving the communication efficiency of the terminal side device.

In addition, in addition to being used in the cross-carrier scheduling application scenario in the foregoing example, the wireless communication method provided in this embodiment may further be used for resource scheduling between paired carriers. Specifically, because there is a pairing relationship between an uplink carrier and a downlink carrier of the terminal side device, and one uplink carrier is paired with one downlink carrier, when subcarrier spacings of the downlink carrier and the paired uplink carrier are different, the wireless communication method provided in this embodiment of this application may be used to perform resource scheduling between the paired carriers. Specifically, in the embodiment shown in FIG. 8, the first frequency band is a downlink carrier, the second frequency band is an uplink carrier, and the first frequency band and the second frequency band are paired carriers. After obtaining the physical layer signaling on the downlink carrier, namely, the first frequency band, the terminal side device transmits the uplink data on the paired uplink carrier, namely, the second frequency band based on the sequence number of the time transmission unit of the uplink resource, indicated by the physical layer signaling, on the uplink carrier, namely, the second frequency band.

Figure 11:
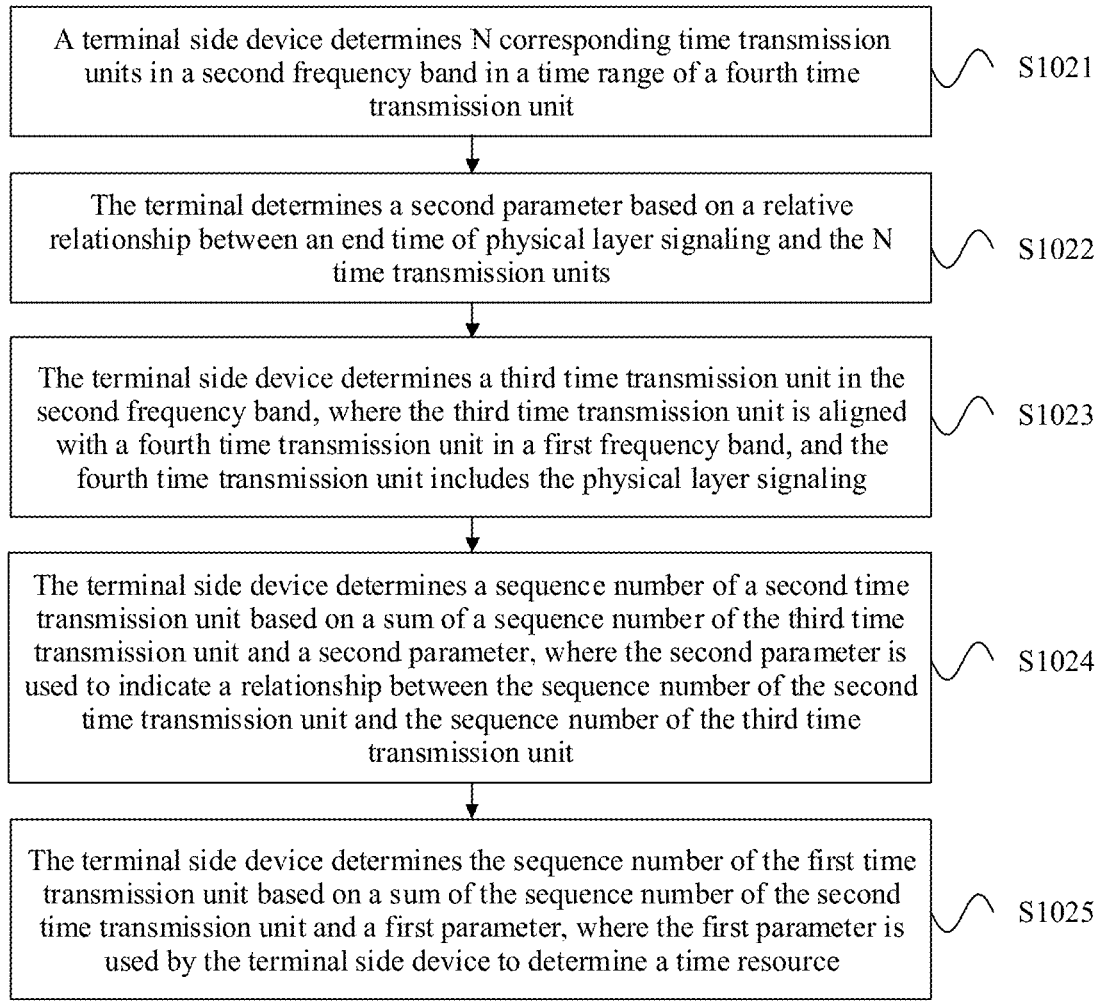
FIG. 11 is a schematic flowchart of an embodiment of a wireless communication method according to this application.

Further, FIG. 11 is a schematic flowchart of an embodiment of a wireless communication method according to this application. In an embodiment shown in FIG. 11, a specific implementation method for determining, by the terminal side device, the sequence number of the first time transmission unit in S102 is provided.

Specifically, S102 may include S1025: The terminal side device determines the sequence number of the first time transmission unit based on a sum of the sequence number of the second time transmission unit and a first parameter, where the first parameter is used by the terminal side device to determine the time resource.

The first parameter may be an offset parameter, and the offset parameter is used to indicate a relative position relationship between the second time transmission unit and the first time transmission unit. The terminal side device may determine, by using the first parameter, the sequence number of the first time transmission unit in which the time resource is located. The end time of the physical layer signaling in the first frequency band is correspondingly within a time range of the second time transmission unit in the second frequency band. Therefore, after determining the sequence number of the second time transmission unit, the terminal side device may add the first parameter to the sequence number of the second time transmission unit to obtain the sequence number of the first time transmission unit.

Further, to determine the sequence number of the second time transmission unit, before S1025, the terminal side device may further perform the following steps: S1023: The terminal side device determines a third time transmission unit in the second frequency band, where the third time transmission unit is aligned with a fourth time transmission unit in the first frequency band, and the fourth time transmission unit includes the physical layer signaling. S1024: The terminal side device determines the sequence number of the second time transmission unit based on a sum of a sequence number of the third time transmission unit and a second parameter, where the second parameter is used to indicate a relationship between the sequence number of the second time transmission unit and the sequence number of the third time transmission unit.

The second parameter may also be an offset parameter, and the second parameter is used to determine a position of the third time transmission unit relative to the fourth time transmission unit. As shown in FIG. 8, the fourth time transmission unit in the first frequency band includes the transmitted physical layer signaling, and the fourth time transmission unit is aligned with the third time transmission unit in the second frequency band, that is, a start time of the fourth time transmission unit is the same as a start time of the third time transmission unit. It should be noted that the alignment mentioned in the embodiments of this application is completely strict alignment in an ideal case. However, in an actual application, synchronization between two frequency bands may not be strictly implemented, and a millisecond-level time difference is allowed. This is a case of non-strict alignment. In this application, both the strict alignment and the non-strict alignment are considered as normal cases in which alignment can be performed. This is not specifically limited in this application. Therefore, after determining the sequence number of the third time transmission unit, the terminal side device may add the second parameter to the sequence number of the third time transmission unit to obtain the sequence number of the second time transmission unit.

Optionally, one possible implementation of determining, by terminal side device, the second parameter is: S1021: The terminal side device determines, in a time range of the fourth time transmission unit, N corresponding time transmission units in the second frequency band, where N≥2. S1022: The terminal side device determines the second parameter based on a relative relationship between the end time of the physical layer signaling and the N time transmission units.

For example, the time transmission unit shown in FIG. 9 is used as an example. In FIG. 9, the subband spacing of the second frequency band is twice the subband spacing of the first frequency band. In this case, in a time range of a time transmission unit whose sequence number is n in the first frequency band, sequence numbers of two corresponding time transmission units in the second frequency band are respectively 2n and 2n+1. The time transmission unit whose sequence number is n in the first frequency band is aligned with the time transmission unit whose sequence number is 2n in the second frequency band. A relative position of the aligned time transmission unit 2n in the second frequency band is denoted as 0, and a relative position of the time transmission unit 2n+1 in the second frequency band is denoted as 1. Therefore, the terminal side device can determine, based on that a sequence number of a time transmission unit that is in the second frequency band and that corresponds to the end time of the PDCCH carrying the DCI is 2n+1, that a relative position of the time transmission unit is 1, and further determine that the second parameter t=1. It should be noted that, in this embodiment, that the subband spacing of the second frequency band is twice the subband spacing of the first frequency band is merely used as an example. If the subband spacing of the second frequency band is four times the subband spacing of the first frequency band, it may be determined that sequence numbers of four time transmission units in the second frequency band are 4n, 4n+1, 4n+2, and 4n+3 in sequence and relative positions are denoted as 0, 1, 2, and 3, and then the second parameter is determined. An implementation and a principle of that the subband spacing of the second frequency band is four times the subband spacing of the first frequency band are the same as those of that the subband spacing of the second frequency band is twice the subband spacing of the first frequency band, and details are not described again.

More specifically, in the foregoing embodiment, when the DCI is used to schedule a PDSCH, and the terminal side device determines the sequence number of the first time transmission unit in the second frequency band, there are the following specific embodiments. Refer to the schematic structural diagram of the time transmission unit shown in FIG. 9. A method that is provided in this embodiment and that is for determining, by the terminal side device based on the PDCCH that carries the DCI and that is received in the time transmission unit 2n in the first frequency band, a sequence number of a time transmission unit that is in the second frequency band and in which a PDSCH resource indicated by the DCI is located includes:

1. The terminal side device receives higher layer signaling PDSCH-Config or PDSCH-Config Common, and obtains a PDSCH-time domain resource allocation list from the higher layer signaling PDSCH-Config or PDSCH-Config Common. If the terminal side device does not receive the PDSCH-Config or the PDSCH-Config Common, the terminal side device uses a default PDSCH-time domain resource allocation list.

2. The terminal side device receives the physical layer signaling, for example, the DCI carried on the PDCCH, and obtains a time domain resource index based on a time domain resource assignment in the DCI.

3. The terminal side device searches the PDSCH-time domain resource allocation list for a PDCCH-PDSCH slot offset $K_0$ corresponding to the index, namely, the first parameter in the foregoing embodiment, to determine a sequence number difference between a slot for transmitting the PDSCH and the slot 2n.

4. The terminal side device determines the second parameter based on the subband spacing μPDCCH of the first frequency band and the subband spacing μPDSCH of the second frequency band used to transmit the PDSCH. In this embodiment, the letter t is used to represent the second parameter, where if μPDCCH≥μPDSCH, t=0; or if μPDCCH<μPDSCH, the terminal side device determines a value of the second parameter t based on a time domain position of the PDCCH used to schedule the PDSCH in the first frequency band and the sequence number of the time transmission unit that is in the second frequency band and that corresponds to the end time of the PDCCH. Specifically, the second parameter t is used to indicate the sequence number of the time transmission unit that is in the second frequency band and that corresponds to the end time of the PDCCH, a sequence number of a time transmission unit that is in the second frequency band and that is aligned with a start time of a time transmission unit in which the transmitted PDCCH is located in the first frequency band, and a relative relationship between the time transmission units.

A possible implementation of determining t is as follows: The terminal side device determines, in the time range of the time transmission unit in which the PDCCH carrying the DCI is located in the first frequency band, the N corresponding time transmission units in the second frequency band. When the subband spacing of the first frequency band is less than the subband spacing of the second frequency band, N≥2. In this case, the terminal side device determines the second parameter t based on a relative relationship between the end time of the PDCCH carrying the DCI and the N time transmission units in the second frequency band. An implementation of determining the second parameter t is the same as that in the foregoing embodiment, and details are not described herein again.

5. The terminal side device calculates, according to $$\left\lfloor n \cdot \frac{2^{\mu_{PDSCH}}}{2^{\mu_{PDCCH}}} \right\rfloor + t + K_0,$$

the sequence number of the slot for transmitting the PDSCH resource scheduled by using the DCI in the second frequency band, where n is a sequence number of a slot in which the PDCCH carrying the DCI is located in the first frequency band, and $$\left\lfloor n \cdot \frac{2^{\mu_{PDSCH}}}{2^{\mu_{PDCCH}}} \right\rfloor$$

is used to determine a sequence number of a slot that is in the second frequency band and that is aligned with the slot in which the PDCCH is located in the first frequency band.

$$\left\lfloor n \cdot \frac{2^{\mu_{PDSCH}}}{2^{\mu_{PDCCH}}} \right\rfloor + t$$

obtained after adding the second parameter t to the obtained $$\left\lfloor n \cdot \frac{2^{\mu_{PDSCH}}}{2^{\mu_{PDCCH}}} \right\rfloor$$

is the sequence number of the slot that is in the second frequency band and that corresponds to the end time of the PDCCH. Finally, the sequence number 2n+1 of the slot for transmitting the PDSCH resource scheduled by using the DCI in the second frequency band is obtained by using the sequence number of the slot 2n+1 as a reference, and adding the first parameter $K_0$ configured in the PDSCH-time domain resource allocation list.

In the foregoing embodiment, when the DCI is used to schedule a PUSCH, and the terminal side device determines the sequence number of the first time transmission unit in the second frequency band, there are the following specific embodiments. Refer to the schematic structural diagram of the time transmission unit shown in FIG. 10. Specifically, a method that is provided in this embodiment and that is for determining, by the terminal side device based on the PUCCH that carries the DCI and that is received in the time transmission unit 2n in the first frequency band, a sequence number of a time transmission unit that is in the second frequency band and in which a PUSCH resource indicated by the DCI is located includes:

1. The terminal side device receives higher layer signaling PUSCH-Config or PUSCH-Config Common, and obtains a PUSCH-time domain resource allocation list from the higher layer signaling PUSCH-Config or PUSCH-Config Common. If the terminal side device does not receive the PUSCH-Config or the PUSCH-Config Common, the terminal side device uses a default PUSCH-time domain resource allocation list.

2. The terminal side device receives the physical layer signaling, for example, the DCI carried on the PDCCH, and obtains a time domain resource index based on a time domain resource assignment in the DCI.

3. The terminal side device searches the PUSCH-time domain resource allocation list for a PDCCH-PUSCH slot offset $K_2$ corresponding to the index, namely, the first parameter in the foregoing embodiment, to determine a sequence number difference between a slot for transmitting the PUSCH and the slot 2n.

4. The terminal side device determines the second parameter based on the subband spacing µPDCCH of the first frequency band and the subband spacing µPUSCH of the second frequency band used to transmit the PUSCH. In this embodiment, the letter t is used to represent the second parameter, where if µPDCCH≥µPUSCH, t=0; or if µPDCCH<µPUSCH, the terminal side device determines a value of the second parameter t based on a time domain position of the PDCCH used to schedule the PUSCH in the first frequency band and the sequence number of the time transmission unit that is in the second frequency band and that corresponds to the end time of the PDCCH. Specifically, the second parameter t is used to indicate the sequence number of the time transmission unit that is in the second frequency band and that corresponds to the end time of the PDCCH, a sequence number of a time transmission unit that is in the second frequency band and that is aligned with a start time of a time transmission unit in which the transmitted PDCCH is located in the first frequency band, and a relative relationship between the time transmission units.

A possible implementation of determining t is as follows: The terminal side device determines, in the time range of the time transmission unit in which the PDCCH carrying the DCI is located in the first frequency band, the N corresponding time transmission units in the second frequency band. When the subband spacing of the first frequency band is less than the subband spacing of the second frequency band, N≥2. In this case, the terminal side device determines the second parameter t based on a relative relationship between the end time of the PDCCH carrying the DCI and the N time transmission units in the second frequency band. A specific implementation and a principle are the same as those in the foregoing PDSCH embodiment, and details are not described herein again.

5. The terminal side device calculates, according to $$\left\lfloor n \cdot \frac{2^{\mu_{PUSCH}}}{2^{\mu_{PDCCH}}} \right\rfloor + t + K_2,$$

the sequence number of the slot for transmitting the PUSCH resource scheduled by using the DCI in the second frequency band, where n is a sequence number of a slot in which the PDCCH carrying the DCI is located in the first frequency band, and $$\left\lfloor n \cdot \frac{2^{\mu_{PUSCH}}}{2^{\mu_{PDCCH}}} \right\rfloor$$

is used to determine a sequence number of a slot that is in the second frequency band and that is aligned with the slot in which the PDCCH is located in the first frequency band.

$$\left\lfloor n \cdot \frac{2^{\mu_{PUSCH}}}{2^{\mu_{PDCCH}}} \right\rfloor + t$$

obtained after adding the second parameter t to the obtained $$\left\lfloor n \cdot \frac{2^{\mu_{PUSCH}}}{2^{\mu_{PDCCH}}} \right\rfloor$$

is the sequence number of the slot that is in the second frequency band and that corresponds to the end time of the PDCCH. Finally, the sequence number 2n+1 of the slot for transmitting the PUSCH resource scheduled by using the DCI in the second frequency band is obtained by using the sequence number of the slot 2n+1 as a reference, and adding the first parameter $K_2$ configured in the PUSCH-time domain resource allocation list.

S103: The terminal side device receives or sends the communication data on the time resource included in the first time transmission unit.

Specifically, the terminal side device determines, based on the sequence number that is of the first time transmission unit and that is determined in S102, the first time transmission unit corresponding to the sequence number of the first time transmission unit, and receives or sends the communication data on the time resource in the first time transmission unit. The physical layer signaling is used to indicate that the time resource in the first time transmission unit is used to transmit the communication data of the terminal side device. In this case, after determining, based on S102, the first time transmission unit indicated by the physical layer signaling, the terminal side device needs to process the communication data of the terminal side device on the time resource indicated by the physical layer signaling in the first time transmission unit. When the communication data is downlink communication data of the terminal side device, the terminal side device receives, on the time resource indicated by the physical layer signaling in the first time transmission unit, the downlink communication data sent by the network side device. When the communication data is uplink communication data of the terminal side device, the terminal side device sends the uplink communication data to the network side device on the time resource indicated by the physical layer signaling in the first time transmission unit. Optionally, the communication data in this embodiment is a PUSCH or a PDSCH.

In conclusion, according to the wireless communication method provided in this embodiment of this application, the relationship between the end time of the physical layer signaling in the first frequency band and the time transmission unit in the second frequency band is considered, to determine the time transmission unit in which the time resource used to transmit the communication data indicated by the physical layer signaling is located in the second frequency band. In this way, the time transmission unit that is determined by the terminal side device and in which the time resource indicated by the physical layer signaling is located in the second frequency band is not later than the time transmission unit that is in the second frequency band and that corresponds to the end time of transmitting the physical layer signaling. This feature brings the following benefits:

For the downlink communication data, even if the terminal side device obtains the physical layer signaling from the second half of the time transmission unit in the first frequency band, the terminal side device can directly obtain the downlink communication data from the time transmission unit that is in the second frequency band and that corresponds to the end time of the physical layer signaling. Alternatively, the downlink communication data is obtained from a previous time transmission unit that is in the second frequency band, that corresponds to the end time of the physical layer signaling, and that is stored in the terminal side device. Therefore, the terminal side device only needs to store one time transmission unit that is in the second frequency band and that is before the end time of the physical layer signaling, and the terminal side device does not need to specially store more time transmission units that are in the second frequency band and that are before the end time of the physical layer signaling, thereby reducing, when the terminal side device processes the downlink communication data, a requirement and overheads for storing a time transmission unit, and improving the storage efficiency and the communication efficiency of the terminal side device.

For the uplink communication data, even if the terminal side device obtains the physical layer signaling from the second half of the time transmission unit in the first frequency band, a reserved time further exists for performing operations such as parsing and checking on the physical layer signaling, then determining the time resource that is for the uplink communication data and that is indicated by the physical layer signaling, and preparing for sending the uplink data on the time resource indicated by the physical layer signaling. In this way, it is ensured that after obtaining the physical layer signaling, the terminal side device can use the time resource that is used for the uplink communication data on the second carrier and that is indicated by the physical layer signaling, so that a case in which a configured time resource cannot be used and a parameter configured in a resource indication table used for configuring a time resource cannot be used is avoided, thereby further improving the communication efficiency of the terminal side device.

For the network side device, when the communication data of the terminal side device is configured, the communication data of the terminal side device is configured to be transmitted on only the time resource in the first time transmission unit, and the sequence number of the first time transmission unit is greater than or equal to the sequence number of the second time transmission unit in the second frequency band, that is, the sequence number of the first time transmission unit cannot be less than the sequence number of the second time transmission unit. The network side device may enable, by using information included in the physical layer signaling, the terminal side device to determine the sequence number of the first time transmission unit. This further improves efficiency of communication between the network side device and the terminal side device.

Further, in the foregoing embodiment, in addition to a manner of determining, by adding the second parameter, the sequence number of the time transmission unit in which the time resource indicated by the physical layer signaling transmitted on the second carrier is located, optionally, an embodiment of this application further provides still another implementation of S102 in which the terminal side device determines the sequence number of the first time transmission unit in the second frequency band in the embodiment shown in FIG. 7.

The sequence number of the time transmission unit in which the time resource indicated by the physical layer signaling transmitted on the second carrier is located is determined by modifying values of a parameter $K_0$ corresponding to an index in the PUSCH-time domain resource allocation list and a parameter $K_2$ corresponding to an index in the PDSCH-time domain resource allocation list, without needing to add a process of calculating the second parameter.

Specifically, for the PDSCH in the downlink communication data, Table 5.1.2.1.1-2: Default PDSCH time domain resource allocation A in the existing TS 38.214 protocol is shown in Table 1 below.

TABLE 1

| Row index | Time position of a demodulation reference signal RS dmrs-TypeA-Position | PDSCH mapping type PDSCH mapping type | $K_0$ | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Tvne A | 0 | 2 | 9 |
|   | 3 | Tvne A | 0 | 3 | 8 |
| 4 | 2 | Tvne A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

Row index is a row index, dmrs-TypeA-position is a time position of a demodulation reference signal (RS), PDSCH mapping type is a PDSCH mapping type, $K_0$ is a PDCCH-PDSCH slot offset $K_0$, namely, the first parameter in the foregoing embodiment, S is a symbol at the beginning of the time resource, and L is a quantity of consecutive symbols of the time resource. In Table 1, there is only a configuration of $K_0=0$ for values of all indexes. This means that the sequence number that is of the first time transmission unit and that is determined by the terminal side device based on the index included in the received physical layer signaling may be less than the sequence number of the second time transmission unit, and the terminal side device needs to store downlink data in a relatively large quantity of time transmission units. However, to enable the sequence number that is of the first time transmission unit and that is determined by the terminal side device in Table 1 based on the index to be greater than or equal to the sequence number of the second time transmission unit in the second frequency band, it may be considered to modify the existing Table 2, to add a configuration of $K_0!=0$, that is, $K_0$ is not equal to 0, corresponding to an existing index to Table 1. Therefore, the sequence number that is of the first time transmission unit and that is determined by the terminal side device is not less than the sequence number of the second time transmission unit, thereby reducing, when the terminal side device processes the downlink communication data, a requirement and overheads for storing a time transmission unit, and improving the storage efficiency and the communication efficiency of the terminal side device.

In addition, for the PUSCH in the uplink communication data, Table 6.1.2.1.1-2: Default PUSCH time domain resource allocation A in the existing TS 38.214 protocol is shown in Table 2 below.

TABLE 2

| Row index | PUSCH mapping type | $K_2$ | S | L |
|---|---|---|---|---|
| 1 | Type A | i | 0 | 14 |
| 2 | Type A | i | 0 | 12 |
| 3 | Type A | i | 0 | 10 |
| 4 | Type B | i | 2 | 10 |
| 5 | Type B | i | 4 | 10 |
| 6 | Type B | i | 4 | 8 |
| 7 | Type B | i | 4 | 6 |
| 8 | Type A | i + 1 | 0 | 14 |
| 9 | Type A | i + 1 | 0 | 12 |
| 10 | Type A | i + 1 | 0 | 10 |
| 11 | Type B | i + 2 | 0 | 14 |
| 12 | Type A | i + 2 | 0 | 12 |
| 13 | Type A | i + 2 | 0 | 10 |
| 14 | Type B | i | 8 | 6 |
| 15 | Type A | i + 3 | 0 | 14 |
| 16 | Type A | i + 3 | 0 | 10 |

Row index is a row index, PUSCH mapping type is a mapping type of a PUSCH, $K_2$ is a PDCCH-PUSCH slot offset $K_2$, namely, the first parameter in the foregoing embodiment, S is a symbol starting from the time resource, and L is a quantity of consecutive symbols of the time resource. In Table 2, for different index values, configurations of $K_2=j$ and $K_2$ j+2 account for a relatively large proportion. This means that the sequence number that is of the first time transmission unit and that is determined by the terminal side device based on the index included in the received physical layer signaling may be less than the sequence number of the second time transmission unit, and no time is reserved for the terminal side device to parse the DCI and prepare the PUSCH data. However, to enable the sequence number that is of the first time transmission unit and that is determined by the terminal side device in Table 2 based on the index to be greater than or equal to the sequence number of the second time transmission unit in the second frequency band, it may be considered to modify the existing Table 2, to add a configuration of $K_2 \geq j+2$ corresponding to an existing index to Table 1. In this way, the sequence number that is of the first time transmission unit and that is determined by the terminal side device is not less than the sequence number of the second time transmission unit, so that it is ensured that after obtaining the physical layer signaling, the terminal side device can use a time resource that is indicated by the physical layer signaling and that is used for uplink communication data on the second carrier, and a waste of radio resources is avoided, thereby further improving the communication efficiency of the terminal side device.

Optionally, an embodiment of this application further provides another implementation of S102 in which the terminal side device determines the sequence number of the first time transmission unit in the second frequency band in the embodiment shown in FIG. 7. Specifically, before S102, the method further includes:

determining, by the terminal side device, first configuration information based on a position of the physical layer signaling in the fourth time transmission unit in the first frequency band, where the fourth time transmission unit includes the physical layer signaling, the physical layer signaling has at least two relative positions in the fourth time unit, and each relative position corresponds to one type of configuration information; and determining, by the terminal side device, the first parameter is based on the physical layer signaling and the first configuration information. After determining the first parameter, the terminal side device determines the sequence number of the first time transmission unit based on a sum of the sequence number of the second time transmission unit and the first parameter according to the method S1025 shown in FIG. 11.

For example, a time unit [t1, t2] in the first frequency band are divided into two equal time ranges [t1, t0] and [t0, t2], and the two time ranges are used as two relative positions. The time range [t1, t0] corresponds to the first configuration information, and the time range [t0, t2] corresponds to second configuration information. The configuration information herein is used by the terminal side device to determine the first parameter, and the configuration information may be the PDSCH-time domain resource allocation list or the PUSCH-time domain resource allocation list in the foregoing embodiment. In this case, when the physical layer signaling obtained by the terminal side device is in the first half of the fourth time transmission unit in the first frequency band, namely, the time range [t1, t0], the terminal side device determines the first parameter based on the first configuration information, and determines the sequence number of the first time transmission unit based on the sum of the sequence number of the second time transmission unit and the first parameter. When the physical layer signaling obtained by the terminal side device is in the second half of the fourth time transmission unit in the first frequency band, namely, in the time range [t0, t2], the terminal side device determines the first parameter based on the second configuration information, and determines the sequence number of the first time transmission unit based on the sum of the sequence number of the second time transmission unit and the first parameter. In this embodiment, implementation methods for the uplink communication data and the downlink communication data are the same, to be specific, different configuration information is determined based on relative positions of the physical layer signaling in the time transmission unit. When the configuration information may be the PDSCH-time domain resource allocation list or the PUSCH-time domain resource allocation list, the terminal side device may obtain different values of the first parameter based on different configuration information when indexes are the same. Finally, the terminal side device obtains the different values of the first parameter based on the different relative positions of the physical layer signaling, and all the values of the first parameter can ensure that the sequence number that is of the first time transmission unit and that is finally determined by the terminal side device is not less than the sequence number of the second time transmission unit.

Optionally, in this embodiment, the terminal side device may obtain a plurality of pieces of configured configuration information by using higher layer signaling from the network side device, and the higher layer signaling carries at least two relative positions of the terminal side device and configuration information corresponding to each relative position. For example, in the foregoing example, the time transmission unit in the first frequency band is divided into two parts, and each part corresponds to one type of configuration information. The network side device configures a relative position of a time transmission unit on each carrier, and configures configuration information corresponding to each relative position. When the terminal side device accesses a network, the network side device sends the configuration information to the terminal side device.

Figure 12:
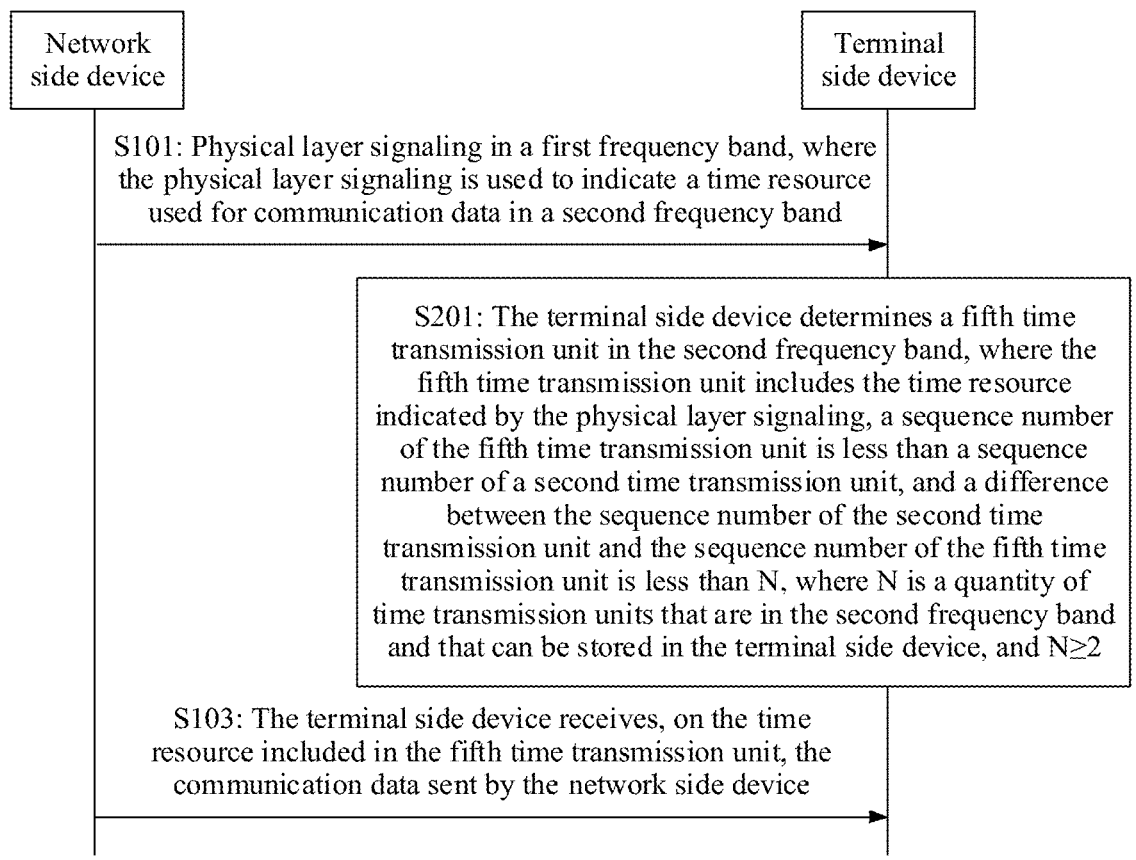
FIG. 12 is a schematic flowchart of an embodiment of a wireless communication method according to this application.

Further optionally, FIG. 12 is a schematic flowchart of an embodiment of a wireless communication method according to this application. In the foregoing embodiment, when the communication data is the downlink communication data, after the terminal side device receives the physical layer signaling from the network side device in S101, the method further includes:

S201: The terminal side device determines a fifth time transmission unit in the second frequency band, where the fifth time transmission unit includes the time resource indicated by the physical layer signaling, a sequence number of the fifth time transmission unit is less than the sequence number of the second time transmission unit, and a difference between the sequence number of the second time transmission unit and the sequence number of the fifth time transmission unit is less than N, where N is a quantity of time transmission units that are in the second frequency band and that can be stored in the terminal side device, and N≥2.

S202: The terminal side device obtains the stored fifth time transmission unit, and obtains, on the time resource included in the fifth time transmission unit, the downlink communication data sent by the network side device.

Figure 13:
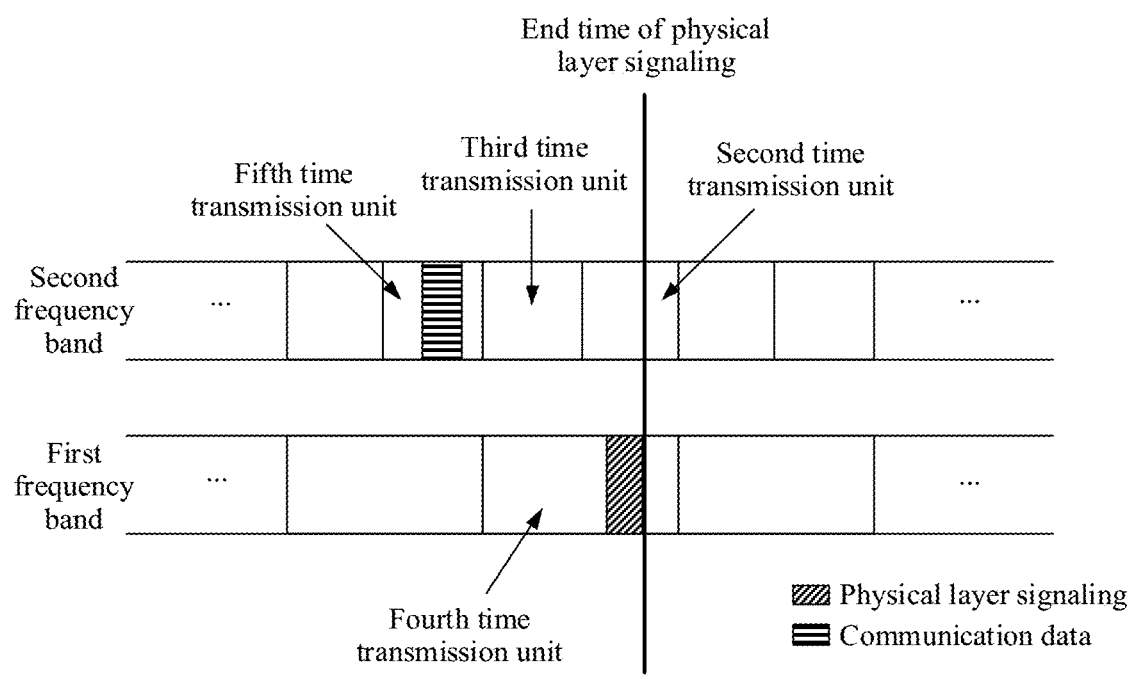
FIG. 13 is a schematic structural diagram of an embodiment of a time transmission unit according to this application.

Specifically, FIG. 13 is a schematic structural diagram of an embodiment of a time transmission unit according to this application. Refer to the schematic structural diagram of the time transmission unit shown in FIG. 13. When the terminal side device receives the physical layer signaling in the fourth transmission unit in the first frequency band, the physical layer signaling indicates the time resource used for the downlink communication data of the terminal side device in the second frequency band. In this case, the terminal side device determines a sequence number of the fifth time transmission unit in the second frequency band. The sequence number of the fifth time transmission unit may be less than the sequence number of the second time transmission unit, and the difference between the sequence number of the fifth time transmission unit and the sequence number of the second time transmission unit needs to be less than the quantity of time transmission units that are in the second frequency band and that can be stored in the terminal side device.

For example, if the terminal side device determines that data of three time transmission units in the second frequency band can be stored, after the terminal side device receives the physical layer signaling in the fourth time transmission unit in the first frequency band, a time unit that is in the second frequency band and that corresponds to the end time of the physical layer signaling is the second time transmission unit. In this case, the time transmission units that can be stored in the terminal side device are the fifth time transmission unit, the third time transmission unit, and the second time transmission unit. Therefore, the fifth time transmission unit determined by the terminal side device based on the physical layer signaling may be any one of the fifth time transmission unit, the third time transmission unit, and the second time transmission unit shown in the figure. In this way, after determining the sequence number of the fifth time transmission unit, the terminal side device can obtain the stored fifth time transmission unit from a storage device of the terminal side device, and obtain, through the fifth time transmission unit, the downlink communication data on the time resource indicated by the physical layer signaling.

Optionally, in the foregoing embodiment, when accessing a network, the terminal side device may further report, to a network side, a quantity of time transmission units that are in each frequency band and that can be stored by the terminal side device. Specifically, the terminal side device may report a storage capability of the terminal side device by using RRC signaling. The terminal side device may carry the storage capability of the terminal side device in a Supported Baseband Processing Combination message in the RRC signaling reported to the network side. For example, the terminal side device may store two time transmission units in the first frequency band and store three time transmission units in the second frequency band. Therefore, both the terminal side device and the network side device can perform cross-carrier scheduling on the downlink communication data of the terminal side device based on the storage capability of the terminal side device, thereby avoiding a case in which a configuration of the cross-carrier scheduling exceeds the storage capability of the terminal side device.

Optionally, in the foregoing embodiment, an implementation in which the terminal side device determines the quantity N of time transmission units that are in the second frequency band and that can be stored in the terminal side device is as follows: The terminal side device determines N based on a bandwidth of a bandwidth part BWP in the second frequency band and a bandwidth of the second frequency band. Specifically, in Release 15 of the NR protocol, one downlink BWP is activated on each carrier of the terminal side device, and a bandwidth of the downlink BWP is less than or equal to a bandwidth of the downlink carrier. A frequency domain range of the downlink communication data, such as a PDSCH, sent by the network side device to the terminal side device is included in a frequency domain range of a downlink BWP. In the prior art, to obtain the downlink communication data, cross-carrier scheduled in the first frequency band, in the second frequency band, the terminal side device stores data of one time transmission unit in the second frequency band. However, if all the downlink communication data is sent in a downlink BWP, the terminal side device obtains the downlink communication data from the downlink BWP, and a bandwidth of the downlink BWP is less than or equal to a bandwidth of a downlink carrier, the terminal side device may store a plurality of BWPs by using space for storing one time transmission unit. For example, if the bandwidth of the downlink BWP is half of the bandwidth of the second frequency band, the terminal side device may store time transmission units in two downlink BWPs by using space for storing one time transmission unit in the second frequency band.

Further, that the terminal side device determines N based on the bandwidth of the bandwidth part BWP of the second frequency band and the bandwidth of the second frequency band may be implemented by using the following formula: N=floor(bandwidth of the second frequency band/bandwidth of the BWP); or N=min(subcarrier spacing of the second frequency band/subcarrier spacing of the first frequency band, floor(bandwidth of the second frequency band/bandwidth of the BWP)).

N=floor(bandwidth of the second frequency band/bandwidth of the BWP) is used to round down a ratio of the bandwidth of the second frequency band to the bandwidth of the BWP, to determine that the terminal side device can store the quantity N of time transmission units of the BWP by using storage space for storing a time transmission unit in the second frequency band. However, in N=min(subcarrier spacing of the second frequency band/subcarrier spacing of the first frequency band, floor(bandwidth of the second frequency band/bandwidth of the BWP)), to prevent a relatively large value of N calculated by using floor (bandwidth of the second frequency band/bandwidth of the BWP), the terminal side device does not expect to store a relatively large amount of data in the storage space at any time. In this case, a minimum value of floor (bandwidth of the second frequency band/bandwidth of the BWP) and a ratio of the subcarrier spacing of the second frequency band to the subcarrier spacing of the first frequency band may be selected. For example, when the subcarrier spacing of the second frequency band is four times the subcarrier spacing of the first frequency band, one time transmission unit in the first frequency band corresponds to four time transmission units in the second frequency band, and even if the terminal side device calculates that floor (bandwidth of the second frequency band/bandwidth of the BWP) is 8, the terminal side device does not need to store a time transmission unit that is in the second frequency band and that is before the time transmission unit in the first frequency band. In this case, the terminal side device determines to still store the four time transmission units that are in the second frequency band and that correspond to one time transmission unit in the first frequency band, that is, determines that N is 4.

Further, the method for determining, by the terminal side device, the quantity N of time transmission units that are in the second frequency band and that can be stored in the terminal side device in the foregoing embodiment may further be applied to the embodiments shown in FIG. 7 and FIG. 11, so that the terminal side device can adjust the second parameter t based on N.

For example, when the terminal side device calculates, according to $$\left\lfloor n \cdot \frac{2^{\mu_{PDSCH}}}{2^{\mu_{PDCCH}}} \right\rfloor + t + K_0,$$

the sequence number of the slot that is in the second frequency band and that is for transmitting the PDSCH resource scheduled by using the DCI, if the quantity N of slots that can be stored in the terminal side device is considered, t'$_0$=Max (t−(N−1),0). After adjusting, the terminal side device finally calculates, according to $$\left\lfloor n \cdot \frac{2^{\mu_{PDSCH}}}{2^{\mu_{PDCCH}}} \right\rfloor + t' + K_0,$$

the sequence number of the slot that is in the second frequency band and that is for transmitting the PDSCH resource scheduled by using the DCI. In this way, the sequence number that is determined by the terminal side device and that is of the slot that is in the second frequency band and that is for transmitting the PDSCH resource scheduled by using the DCI can satisfy the storage capability of the terminal side device, and more possible slot scheduling is supported.

Figure 14:
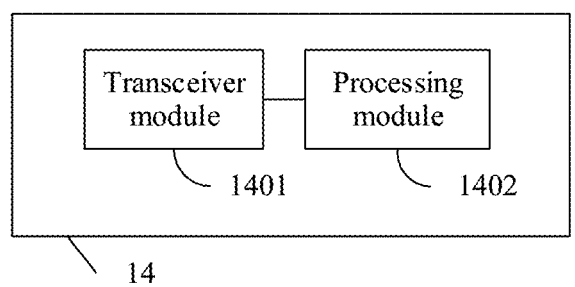
FIG. 14 is a schematic structural diagram of an embodiment of a wireless communications apparatus according to this application.

FIG. 14 is a schematic structural diagram of an embodiment of a wireless communications apparatus according to this application. As shown in FIG. 14, the wireless communications apparatus provided in this embodiment may be the terminal side device and the terminal side device in the foregoing embodiments. The wireless communications apparatus 14 includes a transceiver module 1401 and a processing module 1402. The transceiver module 1401 may be configured to perform sending and receiving actions of the terminal side device in the foregoing method embodiment, and the processing module 1402 may be configured to implement an action of the terminal side device other than the sending and receiving actions, for example, determine a sequence number of a first time transmission unit in a second frequency band.

Specifically, in the apparatus shown in FIG. 14, the transceiver module 1401 is configured to receive physical layer signaling sent by a network side device in a first frequency band, where the physical layer signaling is used to indicate a time resource used for communication data in a second frequency band;

the processing module 1402 is configured to determine a sequence number of a first time transmission unit in the second frequency band, where the first time transmission unit includes the time resource indicated by the physical layer signaling, the sequence number of the first time transmission unit is greater than or equal to a sequence number of a second time transmission unit in the second frequency band, an end time of the physical layer signaling is within a time range of the second time transmission unit, and a subcarrier spacing of the first frequency band is different from a subcarrier spacing of the second frequency band; and the processing module 1402 is further configured to receive or send the communication data on the time resource included in the first time transmission unit.

The wireless communications apparatus provided in this embodiment may be configured to perform the wireless communication method provided in FIG. 7 in the foregoing embodiment. A specific implementation and a principle of the apparatus are the same as those of the method, and details are not described again.

Optionally, when the communication data is uplink communication data, a difference between the sequence number of the first time transmission unit and the sequence number of the second time transmission unit is greater than or equal to a preset positive integer threshold.

Optionally, the processing module 1402 is specifically configured to determine the sequence number of the first time transmission unit based on a sum of the sequence number of the second time transmission unit and a first parameter, where the first parameter is used by the terminal side device to determine the time resource.

Optionally, the processing module 1402 is specifically configured to: determine a third time transmission unit in the second frequency band, where the third time transmission unit is aligned with a fourth time transmission unit in the first frequency band, and the physical layer signaling uses a time resource of the fourth time transmission unit in the first frequency band; and determine the sequence number of the second time transmission unit based on a sum of a sequence number of the third time transmission unit and a second parameter, where the second parameter is used to indicate a relationship between the sequence number of the second time transmission unit and the sequence number of the third time transmission unit.

Optionally, the processing module 1402 is specifically configured to: determine, in a time range of the fourth time transmission unit, N corresponding time transmission units in the second frequency band, where N≥2; and determine the second parameter based on a relative relationship between the end time of the physical layer signaling and the N time transmission units.

The wireless communications apparatus provided in this embodiment may be configured to perform the wireless communication method provided in FIG. 11 in the foregoing embodiment. A specific implementation and a principle of the apparatus are the same as those of the method, and details are not described again.

Optionally, the processing module 1402 is specifically configured to: if the subcarrier spacing of the first frequency band is greater than or equal to the subcarrier spacing of the second frequency band, determine that the second parameter is 0.

Optionally, the processing module 1402 calculates the sequence number of the first time transmission unit by using $$\left\lfloor n \cdot \frac{2^{\mu_2}}{2^{\mu_1}} \right\rfloor + t + K,$$

where n is a sequence number of the fourth time transmission unit, K is the first parameter, t is the second parameter, $\mu_1$ is a subcarrier spacing parameter of the first frequency band, $\mu_2$ is a subcarrier spacing parameter of the second frequency band, and $\Delta f = 2^\mu \cdot 15$ [kHz] for a subcarrier spacing parameter $\mu$, where $\Delta f$ is a subcarrier spacing.

Optionally, the first frequency band and the second frequency band are carriers; or the first frequency band and the second frequency band are bandwidth parts BWPs.

Optionally, the processing module 1402 is further configured to: determine first configuration information based on a position of the physical layer signaling in the fourth time transmission unit in the first frequency band, where the fourth time transmission unit includes the physical layer signaling, the physical layer signaling has at least two relative positions in the fourth time unit, and each relative position corresponds to one type of configuration information; and determine the first parameter based on the physical layer signaling and the first configuration information.

Optionally, the transceiver module 1401 is further configured to receive higher layer signaling from the network side device, where the higher layer signaling carries the at least two relative positions of the terminal side device and the configuration information corresponding to each relative position.

Optionally, the communication data is downlink communication data. The processing module 1402 is further configured to determine a fifth time transmission unit in the second frequency band, where the fifth time transmission unit includes the time resource indicated by the physical layer signaling, a sequence number of the fifth time transmission unit is less than the sequence number of the second time transmission unit, and a difference between the sequence number of the second time transmission unit and the sequence number of the fifth time transmission unit is less than N, where N is a quantity of time transmission units that are in the second frequency band and that can be stored in the terminal side device, and N≥2; and a second processing unit 1403 is further configured to: obtain the stored fifth time transmission unit, and obtain the downlink communication data on the time resource included in the fifth time transmission unit.

The wireless communications apparatus provided in this embodiment may be configured to perform the wireless communication method provided in FIG. 12 in the foregoing embodiment. A specific implementation and a principle of the apparatus are the same as those of the method, and details are not described again.

Optionally, the transceiver module 1401 is further configured to send N to the network side device.

Optionally, the processing module 1402 is further configured to determine N based on a bandwidth of a bandwidth part BWP of the second frequency band and a bandwidth of the second frequency band.

Optionally, the processing module 1402 is specifically configured to: determine N according to N=floor(bandwidth of the second frequency band/bandwidth of the BWP); or determine N according to N=min(subcarrier spacing of the second frequency band/subcarrier spacing of the first frequency band, floor(bandwidth of the second frequency band/bandwidth of the BWP)).

The wireless communications apparatus provided in this embodiment may be configured to perform the wireless communication method provided in the foregoing embodiment. A specific implementation and a principle of the apparatus are the same as those of the method, and details are not described again.

Figure 15:
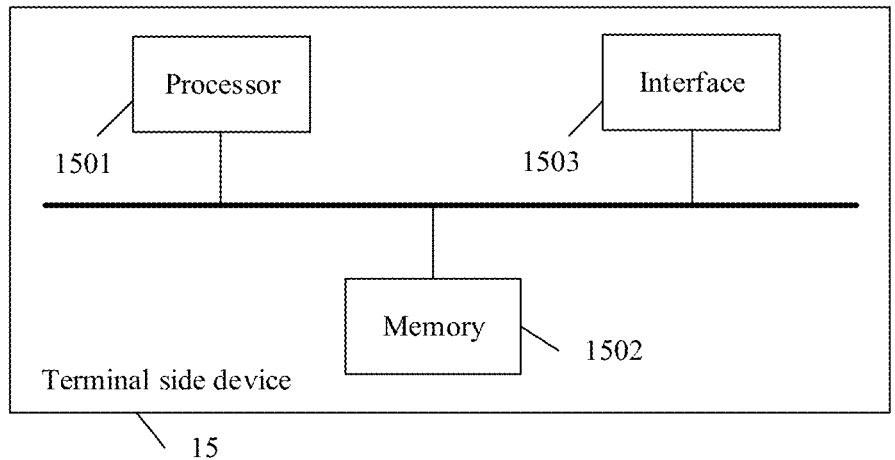
FIG. 15 is a schematic structural diagram of an embodiment of a terminal side device according to this application.

FIG. 15 is a schematic structural diagram of an embodiment of a terminal side device according to this application. As shown in FIG. 15, the terminal side device provided in this embodiment may be the terminal side device and the terminal side device in the embodiment in FIG. 14. The terminal side device 15 shown in FIG. 11 is the first terminal side device in the foregoing embodiment, and includes a processor 1501, a memory 1502, and an interface 1503. The memory 1502 is configured to store a computer program. The processor 1501 invokes the computer program, and when the computer program is executed, the processor 1501 is configured to perform the following operations:

receiving, through the interface 1503, physical layer signaling sent by a network side device in a first frequency band, where the physical layer signaling is used to indicate a time resource used for communication data in a second frequency band;

determining a sequence number of a first time transmission unit in the second frequency band, where the first time transmission unit includes the time resource indicated by the physical layer signaling, the sequence number of the first time transmission unit is greater than or equal to a sequence number of a second time transmission unit in the second frequency band, an end time of the physical layer signaling is within a time range of the second time transmission unit, and a subcarrier spacing of the first frequency band is different from a subcarrier spacing of the second frequency band; and receiving or sending the communication data on the time resource included in the first time transmission unit.

The terminal side device provided in this embodiment may be configured to perform the wireless communication method provided in FIG. 7 in the foregoing embodiment. A specific implementation and a principle of the terminal side device are the same as those of the method, and details are not described again.

Optionally, when the communication data is uplink communication data, a difference between the sequence number of the first time transmission unit and the sequence number of the second time transmission unit is greater than or equal to a preset positive integer threshold.

Optionally, the sequence number of the first time transmission unit is determined based on a sum of the sequence number of the second time transmission unit and a first parameter, where the first parameter is used by the terminal side device to determine the time resource.

Optionally, a third time transmission unit in the second frequency band is determined, where the third time transmission unit is aligned with a fourth time transmission unit in the first frequency band, and the physical layer signaling uses a time resource of the fourth time transmission unit in the first frequency band; and the sequence number of the second time transmission unit is determined based on a sum of a sequence number of the third time transmission unit and a second parameter, where the second parameter is used to indicate a relationship between the sequence number of the second time transmission unit and the sequence number of the third time transmission unit.

Optionally, N corresponding time transmission units in the second frequency band are determined in a time range of the fourth time transmission unit, where N≥2.

Optionally, the second parameter is determined based on a relative relationship between the end time of the physical layer signaling and the N time transmission units.

The terminal side device provided in this embodiment may be configured to perform the wireless communication method provided in FIG. 11 in the foregoing embodiment. A specific implementation and a principle of the terminal side device are the same as those of the method, and details are not described again.

Optionally, if the subcarrier spacing of the first frequency band is greater than or equal to the subcarrier spacing of the second frequency band, that the second parameter is 0 is determined.

Optionally, the sequence number of the first time transmission unit is calculated by using $$\left\lfloor n \cdot \frac{2^{\mu_2}}{2^{\mu_1}} \right\rfloor + t + K,$$

where n is a sequence number of the fourth time transmission unit, K is the first parameter, t is the second parameter, $\mu_1$ is a subcarrier spacing parameter of the first frequency band, $\mu_2$ is a subcarrier spacing parameter of the second frequency band, and $\Delta f = 2^\mu \cdot 15$ [kHz] for a subcarrier spacing parameter $\mu$, where $\Delta f$ is a subcarrier spacing.

Optionally, the first frequency band and the second frequency band are carriers; or the first frequency band and the second frequency band are bandwidth parts BWPs.

Optionally, first configuration information is determined based on a position of the physical layer signaling in the fourth time transmission unit in the first frequency band, where the fourth time transmission unit includes the physical layer signaling, the physical layer signaling has at least two relative positions in the fourth time unit, and each relative position corresponds to one type of configuration information; and the first parameter is determined based on the physical layer signaling and the first configuration information.

Optionally, higher layer signaling is received from the network side device through the interface 1503, where the higher layer signaling carries the at least two relative positions of the terminal side device and the configuration information corresponding to each relative position.

Optionally, the communication data is downlink communication data. A fifth time transmission unit in the second frequency band is determined, where the fifth time transmission unit includes the time resource indicated by the physical layer signaling, a sequence number of the fifth time transmission unit is less than the sequence number of the second time transmission unit, and a difference between the sequence number of the second time transmission unit and the sequence number of the fifth time transmission unit is less than N, where N is a quantity of time transmission units that are in the second frequency band and that can be stored in the terminal side device, and N≥2; and the stored fifth time transmission unit is obtained, and the downlink communication data is obtained on the time resource included in the fifth time transmission unit.

The terminal side device provided in this embodiment may be configured to perform the wireless communication method provided in FIG. 12 in the foregoing embodiment. A specific implementation and a principle of the terminal side device are the same as those of the method, and details are not described again.

Optionally, N is sent to the network side device through the interface.

Optionally, N is determined based on a bandwidth of a bandwidth part BWP of the second frequency band and a bandwidth of the second frequency band.

Optionally, N is determined according to N=floor(bandwidth of the second frequency band/bandwidth of the BWP) or N=min(subcarrier spacing of the second frequency band/subcarrier spacing of the first frequency band, floor(bandwidth of the second frequency band/bandwidth of the BWP)).

The terminal side device provided in this embodiment may be configured to perform the wireless communication method provided in the foregoing embodiment. A specific implementation and a principle of the terminal side device are the same as those of the method, and details are not described again.

Figure 16:
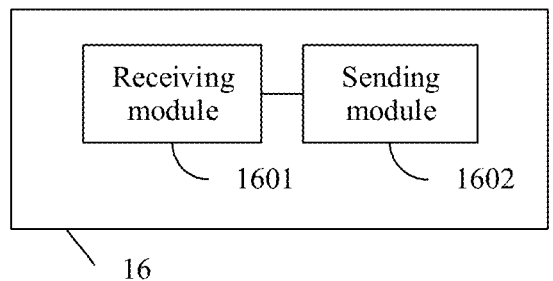
FIG. 16 is a schematic structural diagram of an embodiment of a wireless communications apparatus according to this application.

FIG. 16 is a schematic structural diagram of an embodiment of a wireless communications apparatus according to this application. As shown in FIG. 16, the apparatus 16 provided in this embodiment may be the network side device in the foregoing embodiment, and includes a receiving module 1601 and a sending module 1602, where the sending module 1602 is configured to send physical layer signaling to a terminal side device in a first frequency band, where the physical layer signaling is used to indicate a time resource used for communication data in a second frequency band; and the sending module 1602 is further configured to send the communication data on the time resource included in a first time transmission unit, or the receiving module 1601 is configured to receive the communication data on the time resource included in a first time transmission unit, where the first time transmission unit includes the time resource indicated by the physical layer signaling, a sequence number of the first time transmission unit is greater than or equal to a sequence number of a second time transmission unit in the second frequency band, an end time of the physical layer signaling is within a time range of the second time transmission unit, and a subcarrier spacing of the first frequency band is different from a subcarrier spacing of the second frequency band.

The wireless communications apparatus provided in this embodiment may be configured to perform the wireless communication method provided in FIG. 7 in the foregoing embodiment. A specific implementation and a principle of the apparatus are the same as those of the method, and details are not described again.

Optionally, when the communication data is uplink communication data, a difference between the sequence number of the first time transmission unit and the sequence number of the second time transmission unit is greater than or equal to a preset positive integer threshold.

Optionally, the first frequency band and the second frequency band are carriers; or the first frequency band and the second frequency band are bandwidth parts BWPs.

The sending module 1602 is further configured to: send higher layer signaling to the terminal side device, where the higher layer signaling carries at least two relative positions of the physical layer signaling of the terminal side device in a fourth time transmission unit in the first frequency band and configuration information corresponding to each relative position, the at least two pieces of configuration information are used by the terminal side device to determine first configuration information; and determine a first parameter based on the physical layer signaling and the first configuration information.

The sending module 1602 is further configured to: send the communication data on the time resource included in a fifth time transmission unit, where the fifth time transmission unit includes the time resource indicated by the physical layer signaling, a sequence number of the fifth time transmission unit is less than the sequence number of the second time transmission unit, and a difference between the sequence number of the second time transmission unit and the sequence number of the fifth time transmission unit is less than N, where N is a quantity of time transmission units that are in the second frequency band and that can be stored in the terminal side device, and N≥2.

Optionally, the receiving module 1601 is further configured to receive N sent by the terminal side device.

The wireless communications apparatus provided in this embodiment may be configured to perform the wireless communication method provided in the foregoing embodiment. A specific implementation and a principle of the apparatus are the same as those of the method, and details are not described again.

Figure 17:
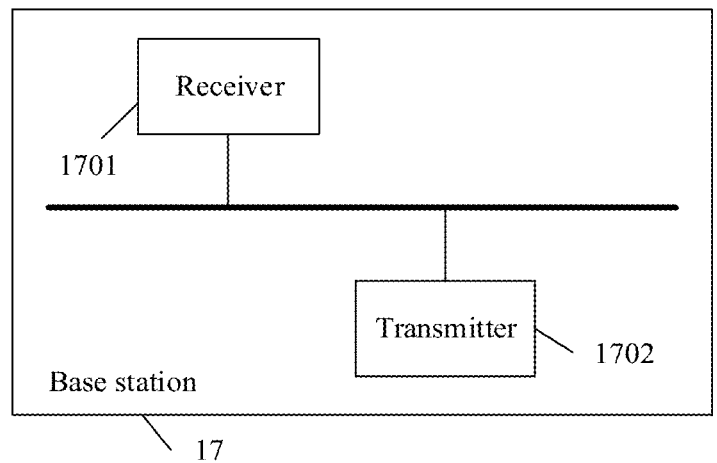
FIG. 17 is a schematic structural diagram of an embodiment of a base station according to this application.

FIG. 17 is a schematic structural diagram of an embodiment of a base station according to this application. The base station provided in this embodiment may be the wireless communications apparatus provided in the embodiment in FIG. 16. As shown in FIG. 17, the base station 17 provided in this embodiment includes a receiver 1701 and a transmitter 1702, where the transmitter 1702 is configured to send physical layer signaling to a terminal side device in a first frequency band, where the physical layer signaling is used to indicate a time resource used for communication data in a second frequency band; and the transmitter 1702 is further configured to send the communication data on the time resource included in a first time transmission unit, or the receiver 1701 is configured to receive the communication data on the time resource included in a first time transmission unit, where the first time transmission unit includes the time resource indicated by the physical layer signaling, a sequence number of the first time transmission unit is greater than or equal to a sequence number of a second time transmission unit in the second frequency band, an end time of the physical layer signaling is within a time range of the second time transmission unit, and a subcarrier spacing of the first frequency band is different from a subcarrier spacing of the second frequency band.

The base station provided in this embodiment may be configured to perform the wireless communication method provided in FIG. 7 in the foregoing embodiment. A specific implementation and a principle of the base station are the same as those of the method, and details are not described again.

Optionally, when the communication data is uplink communication data, a difference between the sequence number of the first time transmission unit and the sequence number of the second time transmission unit is greater than or equal to a preset positive integer threshold.

Optionally, the first frequency band and the second frequency band are carriers; or the first frequency band and the second frequency band are bandwidth parts BWPs.

The transmitter 1702 is further configured to: send higher layer signaling to the terminal side device, where the higher layer signaling carries at least two relative positions of the physical layer signaling of the terminal side device in a fourth time transmission unit in the first frequency band and configuration information corresponding to each relative position, the at least two pieces of configuration information are used by the terminal side device to determine first configuration information; and determine a first parameter based on the physical layer signaling and the first configuration information.

The transmitter 1702 is further configured to: send the communication data on the time resource included in a fifth time transmission unit, where the fifth time transmission unit includes the time resource indicated by the physical layer signaling, a sequence number of the fifth time transmission unit is less than the sequence number of the second time transmission unit, and a difference between the sequence number of the second time transmission unit and the sequence number of the fifth time transmission unit is less than N, where N is a quantity of time transmission units that are in the second frequency band and that can be stored in the terminal side device, and N≥2.

Optionally, the receiver 1701 is further configured to receive N sent by the terminal side device.

The base station provided in this embodiment may be configured to perform the wireless communication method provided in the foregoing embodiment. A specific implementation and a principle of the base station are the same as those of the method, and details are not described again.

This application further provides a wireless communications system, including the base station in FIG. 17 and a plurality of terminal side devices in the embodiment in FIG. 15.

This application further provides a computer-readable storage medium. The computer-readable storage medium stores program code, and when the program code is executed, the wireless communication method in any one of the foregoing embodiments is performed.

This application further provides a computer program product. When program code included in the computer program product is executed by a processor, the wireless communication method in any one of the foregoing embodiments is implemented.

Persons of ordinary skill in the art may understand that some or all of the steps of the method embodiments may be implemented by a program indicating related hardware. The foregoing program may be stored in a computer-readable storage medium. When the program is executed, the steps in the foregoing method embodiments are performed. The foregoing storage medium includes any medium that can store program code, for example, a ROM, a RAM, a magnetic disk, or an optical disc.

Finally, it should be noted that the foregoing embodiments are merely intended for describing the technical solutions of this application rather than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. A wireless communication method, comprising:
   receiving, by a terminal side device, physical layer signaling sent by a network side device in a first frequency band, wherein the physical layer signaling is used to indicate a time resource used for communication data in a second frequency band;
   determining, by the terminal side device based on that a sequence number of a first time transmission unit is greater than or equal to a sequence number of a second time transmission unit in the second frequency band, the sequence number of the first time transmission unit in the second frequency band, wherein the first time transmission unit comprises the time resource indicated by the physical layer signaling, wherein an end time of the physical layer signaling is within a time range of the second time transmission unit, and wherein a subcarrier spacing of the first frequency band is different from a subcarrier spacing of the second frequency band; and
   receiving or sending, by the terminal side device, the communication data on the time resource comprised in the first time transmission unit.

2. The method according to claim 1, wherein when the communication data is uplink communication data, a difference between the sequence number of the first time transmission unit and the sequence number of the second time transmission unit is greater than or equal to a preset positive integer threshold.

3. The method according to claim 1, wherein the determining, by the terminal side device, a sequence number of a first time transmission unit in the second frequency band comprises:
   determining, by the terminal side device, the sequence number of the first time transmission unit based on a sum of the sequence number of the second time transmission unit and a first parameter, wherein the first parameter is used by the terminal side device to determine the time resource.

4. The method according to claim 3, wherein before the determining, by the terminal side device, the sequence number of the first time transmission unit based on a sum of the sequence number of the second time transmission unit and a first parameter, the method further comprises:
   determining, by the terminal side device, a third time transmission unit in the second frequency band, wherein the third time transmission unit is aligned with a fourth time transmission unit in the first frequency band, and wherein the physical layer signaling uses a time resource of the fourth time transmission unit in the first frequency band; and
   determining, by the terminal side device, the sequence number of the second time transmission unit based on a sum of a sequence number of the third time transmission unit and a second parameter, wherein the second parameter is used to indicate a relationship between the sequence number of the second time transmission unit and the sequence number of the third time transmission unit.

5. The method according to claim 1, wherein:
   the first frequency band and the second frequency band are carriers; or
   the first frequency band and the second frequency band are bandwidth parts (BWPs).

6. A wireless communication method, comprising:
   sending, by a network side device, physical layer signaling to a terminal side device in a first frequency band, wherein the physical layer signaling is used to indicate a time resource used for communication data in a second frequency band; and
   receiving or sending, by the network side device, the communication data on the time resource comprised in a first time transmission unit, wherein the first time transmission unit comprises the time resource indicated by the physical layer signaling, wherein a sequence number of the first time transmission unit is greater than or equal to a sequence number of a second time transmission unit in the second frequency band, wherein an end time of the physical layer signaling is within a time range of the second time transmission unit, and wherein a subcarrier spacing of the first frequency band is different from a subcarrier spacing of the second frequency band.

7. The method according to claim 6, wherein when the communication data is uplink communication data, a difference between the sequence number of the first time transmission unit and the sequence number of the second time transmission unit is greater than or equal to a preset positive integer threshold.

8. The method according to claim 6, wherein:
   the first frequency band and the second frequency band are carriers; or
   the first frequency band and the second frequency band are bandwidth parts (BWPs).

9. The method according to claim 6, wherein the method further comprises:
   sending, by the network side device, higher layer signaling to the terminal side device, wherein the higher layer signaling carries at least two relative positions of the physical layer signaling in a fourth time transmission unit in the first frequency band and at least two pieces of configuration information corresponding to the at least two relative positions, wherein the at least two pieces of configuration information are used by the terminal side device to determine first configuration information; and determining a first parameter based on the physical layer signaling and the first configuration information.

10. The method according to claim 6, wherein the communication data is downlink communication data, and wherein the method further comprises:
sending, by the network side device, the communication data on the time resource comprised in a fifth time transmission unit, wherein the fifth time transmission unit comprises the time resource indicated by the physical layer signaling, wherein a sequence number of the fifth time transmission unit is less than the sequence number of the second time transmission unit, wherein a difference between the sequence number of the second time transmission unit and the sequence number of the fifth time transmission unit is less than N, wherein N is a quantity of time transmission units that are in the second frequency band and that can be stored in the terminal side device, and wherein N≥2.

11. An apparatus, comprising:
at least one processor; and
one or more memories coupled to the at least one processor and storing programming instructions for execution by the at least one processor, the programming instructions instructing the apparatus to perform operations comprising:
receiving physical layer signaling sent by a network side device in a first frequency band, wherein the physical layer signaling is used to indicate a time resource used for communication data in a second frequency band;
determining, based on that a sequence number of a first time transmission unit is greater than or equal to a sequence number of a second time transmission unit in the second frequency band, the sequence number of the first time transmission unit in the second frequency band, wherein the first time transmission unit comprises the time resource indicated by the physical layer signaling, wherein an end time of the physical layer signaling is within a time range of the second time transmission unit, and wherein a subcarrier spacing of the first frequency band is different from a subcarrier spacing of the second frequency band; and
receiving or sending the communication data on the time resource comprised in the first time transmission unit.

12. The apparatus according to claim 11, wherein when the communication data is uplink communication data, a difference between the sequence number of the first time transmission unit and the sequence number of the second time transmission unit is greater than or equal to a preset positive integer threshold.

13. The apparatus according to claim 11, wherein the determining a sequence number of a first time transmission unit in the second frequency band comprises:
determining the sequence number of the first time transmission unit based on a sum of the sequence number of the second time transmission unit and a first parameter, wherein the first parameter is used by the apparatus to determine the time resource.

14. The apparatus according to claim 13, wherein before the determining the sequence number of the first time transmission unit based on a sum of the sequence number of the second time transmission unit and a first parameter, the operations further comprises:
determining a third time transmission unit in the second frequency band, wherein the third time transmission unit is aligned with a fourth time transmission unit in the first frequency band, and wherein the physical layer signaling uses a time resource of the fourth time transmission unit in the first frequency band; and
determining the sequence number of the second time transmission unit based on a sum of a sequence number of the third time transmission unit and a second parameter, wherein the second parameter is used to indicate a relationship between the sequence number of the second time transmission unit and the sequence number of the third time transmission unit.

15. The apparatus according to claim 11, wherein:
the first frequency band and the second frequency band are carriers; or
the first frequency band and the second frequency band are bandwidth parts (BWPs).

16. An apparatus, comprising:
at least one processor; and
one or more memories coupled to the at least one processor and storing programming instructions for execution by the at least one processor, the programming instructions instructing the apparatus to perform operations comprising:
sending physical layer signaling to a terminal side device in a first frequency band, wherein the physical layer signaling is used to indicate a time resource used for communication data in a second frequency band; and
receiving or sending the communication data on the time resource comprised in a first time transmission unit, wherein the first time transmission unit comprises the time resource indicated by the physical layer signaling, wherein a sequence number of the first time transmission unit is greater than or equal to a sequence number of a second time transmission unit in the second frequency band, wherein an end time of the physical layer signaling is within a time range of the second time transmission unit, and wherein a subcarrier spacing of the first frequency band is different from a subcarrier spacing of the second frequency band.

17. The apparatus according to claim 16, wherein when the communication data is uplink communication data, a difference between the sequence number of the first time transmission unit and the sequence number of the second time transmission unit is greater than or equal to a preset positive integer threshold.

18. The apparatus according to claim 16, wherein:
the first frequency band and the second frequency band are carriers; or
the first frequency band and the second frequency band are bandwidth parts (BWPs).

19. The apparatus according to claim 16, wherein the operations further comprises:
sending higher layer signaling to the terminal side device, wherein the higher layer signaling carries at least two relative positions of the physical layer signaling in a fourth time transmission unit in the first frequency band and at least two pieces of configuration information corresponding to the at least two relative positions, wherein the at least two pieces of configuration information are used by the terminal side device to determine first configuration information; and determining a first parameter based on the physical layer signaling and the first configuration information.

20. The apparatus according to claim 16, wherein the communication data is downlink communication data, and wherein the operations further comprises:
sending the communication data on the time resource comprised in a fifth time transmission unit, wherein the fifth time transmission unit comprises the time resource indicated by the physical layer signaling, wherein a sequence number of the fifth time transmission unit is less than the sequence number of the second time transmission unit, wherein a difference between the sequence number of the second time transmission unit and the sequence number of the fifth time transmission unit is less than N, wherein N is a quantity of time transmission units that are in the second frequency band and that can be stored in the terminal side device, and wherein N≥2.

* * * * *

UNITED STATES PATENT AND TRADEMARK OFFICE
CERTIFICATE OF CORRECTION

PATENT NO. : 11,974,304 B2
APPLICATION NO. : 17/129470
DATED : April 30, 2024
INVENTOR(S) : Meng Hua, Fei Gao and Shurong Jiao Page 1 of 2

It is certified that error appears in the above-identified patent and that said Letters Patent is hereby corrected as shown below:

In the Claims

Column 49, Line 37, Claim 1, please delete "based on that a sequence number of a first time transmission unit is greater than or equal to a sequence number of a second time transmission unit in the second frequency band, the sequence number of the first time transmission unit in the second frequency band" and insert therefore -- based on that a first time transmission unit is no earlier than a second time transmission unit in the second frequency band, to receive or sending the communication data on the time resource comprised in the first time transmission unit in the second frequency band --;

Column 49, Line 54, Claim 2, please delete "between the sequence number" and insert therefore -- between a sequence number --;

Column 49, Line 55, Claim 2, please delete "the sequence number" and insert therefore -- a sequence number --;

Column 50, Line 36, Claim 6, please delete "a sequence number of";

Column 50, Line 37, Claim 6, please delete "greater than or equal to a sequence number of" and insert therefore -- no earlier than --;

Column 50, Line 47, Claim 7, please delete "the sequence number" and insert therefore -- a sequence number --;

Column 50, Line 48, Claim 7, please delete "the sequence number" and insert therefore -- a sequence number --;

Column 51, Line 31, Claim 11, please delete "a sequence number of";

Signed and Sealed this
Ninth Day of September, 2025

Coke Morgan Stewart
*Acting Director of the United States Patent and Trademark Office*

CERTIFICATE OF CORRECTION (continued)
U.S. Pat. No. 11,974,304 B2

Column 51, Line 32, Claim 11, please delete "greater than or equal to a sequence number of" and insert therefore -- no earlier than --;

Column 51, Line 34, Claim 11, please delete "the sequence number of" and insert therefore -- to receive or sending the communication data on the time resource comprised in --;

Column 51, Line 47, Claim 12, please delete "between the sequence number" and insert therefore -- between a sequence number --;

Column 51, Line 48, Claim 12, please delete "the sequence number" and insert therefore -- a sequence number --;

Column 52, Line 30, Claim 16, please delete "a sequence number of";

Column 52, Line 31, Claim 16, please delete "greater than or equal to a sequence number of" and insert therefore -- no earlier than --;

Column 52, Line 40, Claim 17, please delete "between the sequence number" and insert therefore -- between a sequence number --;

Column 52, Line 41, Claim 17, please delete "the sequence number" and insert therefore -- a sequence number --.